(12) United States Patent
Imai et al.

(10) Patent No.: US 7,636,473 B2
(45) Date of Patent: Dec. 22, 2009

(54) IMAGE COLOR ADJUSTMENT

(75) Inventors: Shun Imai, Nagano-ken (JP); Kenji Fukasawa, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 830 days.

(21) Appl. No.: 11/078,794

(22) Filed: Mar. 11, 2005

(65) Prior Publication Data
US 2005/0213128 A1 Sep. 29, 2005

(30) Foreign Application Priority Data

| Mar. 12, 2004 | (JP) | ............................ 2004-071038 |
| Mar. 30, 2004 | (JP) | ............................ 2004-097487 |
| Jul. 6, 2004 | (JP) | ............................ 2004-198828 |

(51) Int. Cl.
G06K 9/00 (2006.01)
H04N 9/73 (2006.01)

(52) U.S. Cl. ..................... 382/167; 382/162; 348/223.1
(58) Field of Classification Search .............. 348/223.1; 382/162, 167
See application file for complete search history.

(56) References Cited

U.S. PATENT DOCUMENTS

| 5,448,502 | A  | * | 9/1995  | Kindo et al. ................ 382/165 |
| 6,727,942 | B1 | * | 4/2004  | Miyano .................... 348/223.1 |
| 6,853,401 | B2 | * | 2/2005  | Fujii et al. ................ 348/223.1 |
| 7,084,907 | B2 | * | 8/2006  | Takeshita ................. 348/223.1 |
| 7,126,591 | B2 | * | 10/2006 | Kagawa et al. ............. 345/204 |
| 2002/0071041 | A1 | * | 6/2002 | Pine ........................... 348/222 |
| 2002/0085100 | A1 | * | 7/2002 | Takahashi ................... 348/223 |
| 2002/0113881 | A1 | * | 8/2002 | Funston et al. ............. 348/223 |
| 2003/0011686 | A1 | * | 1/2003 | Higuchi .................... 348/223.1 |
| 2003/0058350 | A1 | * | 3/2003 | Ishimaru et al. ........... 348/223.1 |
| 2003/0063197 | A1 | * | 4/2003 | Sugiki ...................... 348/223.1 |
| 2003/0112334 | A1 | * | 6/2003 | Kiyokawa ................. 348/207.1 |
| 2003/0222992 | A1 | * | 12/2003 | Kaplinsky et al. ......... 348/223.1 |
| 2004/0012690 | A1 | * | 1/2004 | Makioka ................... 348/222.1 |
| 2004/0017594 | A1 | * | 1/2004 | Suekane et al. ............. 358/516 |
| 2004/0095478 | A1 | * | 5/2004 | Takano et al. ............. 348/223.1 |

(Continued)

FOREIGN PATENT DOCUMENTS

JP        02-128591        5/1990

(Continued)

OTHER PUBLICATIONS

Abstract of Japanese Patent Publication No. 02-128591, Pub. Date: May 16, 1990, Patent Abstracts of Japan.

(Continued)

*Primary Examiner*—Samir A. Ahmed
*Assistant Examiner*—Li Liu
(74) *Attorney, Agent, or Firm*—Martine Penilla & Gencarella, LLP

(57) ABSTRACT

At least one of a plurality of achromatic object color ranges is selected based on the image targeted for processing, and a color adjustment process is executed based on the selected achromatic object color range. Image may be reproduced using a color image data after a color correction of the color image data, the color correction being performed according to illumination light source associated with the color image data. Image data may also be output after the color correction. Image data may also be output associated with data related to the illumination light source, to reproduce the image after the color correction.

18 Claims, 30 Drawing Sheets

U.S. PATENT DOCUMENTS

2004/0212691 A1* 10/2004 Sato .................. 348/223.1
2005/0046703 A1* 3/2005 Cutler ................. 348/223.1
2005/0047771 A1* 3/2005 Yuyama ............... 396/155
2006/0103728 A1* 5/2006 Ishigami et al. ....... 348/180

FOREIGN PATENT DOCUMENTS

| JP | 02-250488 | 10/1990 |
|---|---|---|
| JP | 10-210494 | 8/1998 |
| JP | 11-205806 | 7/1999 |
| JP | 2001-339740 | 12/2001 |
| JP | 3469305 | 9/2003 |

OTHER PUBLICATIONS

Abstract of Japanese Patent Publication No. 10-210494, Pub. Date: Aug. 7, 1998, Patent Abstracts of Japan.
Abstract of Japanese Patent Publication No. 11-205806, Pub. Date: Jul. 30, 1999, Patent Abstracts of Japan.
Abstract of Japanese Patent Publication No. 07-284118, Pub. Date: Oct. 27, 1995, Patent Abstracts of Japan.
Abstract of Japanese Patent Publication No. 02-250488, Pub. Date: Oct. 8, 1990, Patent Abstracts of Japan.
Abstract of Japanese Patent Publication No. 2001-339740, Pub. Date: Dec. 7, 2001, Patent Abstracts of Japan.

* cited by examiner

AWB_R = CSumG / CSumR

AWB_G = CSumG / CSumG = 1.0

AWB_B = CSumG / CSumB

Rout = AWB_R * Rin
Gout = AWB_G * Gin = Gin
Bout = AWB_B * Bin $$\Delta C(R) = Ka * (AWB\_R - 1.0)$$
$$\Delta C(G) = Ka * (AWB\_G - 1.0) = 0.0$$
$$\Delta C(B) = Ka * (AWB\_B - 1.0)$$

$$\begin{pmatrix} R_{sRGB} \\ G_{sRGB} \\ B_{sRGB} \end{pmatrix} = \begin{pmatrix} 2.9011 & -1.0699 & 0.0845 \\ -1.2904 & 1.9912 & -0.2695 \\ -0.6253 & 0.0488 & 1.4406 \end{pmatrix} \begin{pmatrix} X \\ Y \\ Z \end{pmatrix}$$

CORRESPONDENCE OBTAINED BY COLORIMETRY $$\begin{pmatrix} X(1) \\ Y(1) \\ Z(1) \end{pmatrix} \longleftrightarrow \begin{pmatrix} R(1) \\ G(1) \\ B(1) \end{pmatrix}$$

$$\begin{pmatrix} X'(1) \\ Y'(1) \\ Z'(1) \end{pmatrix} = \begin{pmatrix} a11 & a12 & a13 \\ a21 & a22 & a23 \\ a31 & a32 & a33 \end{pmatrix} \begin{pmatrix} R(1) \\ G(1) \\ B(1) \end{pmatrix}$$

$ER(1) = (X(1)-X'(1))^2 + (Y(1)-Y'(1))^2 + (Z(1)-Z'(1))^2$ $$ER = \sum_{i=1}^{n} ER(i)$$

Fig.25

| INCANDESCENT LIGHT MATRIX: A | $A = \begin{pmatrix} a11 & a12 & a13 \\ a21 & a22 & a23 \\ a31 & a32 & a33 \end{pmatrix}$ |
|---|---|
| FLUORESCENT LIGHT MATRIX: B | $B = \begin{pmatrix} b11 & b12 & b13 \\ b21 & b22 & b23 \\ b31 & b32 & b33 \end{pmatrix}$ |
| SUNLIGHT MATRIX: C | $C = \begin{pmatrix} c11 & c12 & c13 \\ c21 & c22 & c23 \\ c31 & c32 & c33 \end{pmatrix}$ |
| OVERCAST SUNLIGHT MATRIX: D | $D = \begin{pmatrix} d11 & d12 & d13 \\ d21 & d22 & d23 \\ d31 & d32 & d33 \end{pmatrix}$ |

IMAGE COLOR ADJUSTMENT

CROSS-REFERENCE TO RELATED APPLICATIONS

The present application claims the priority based on Japanese Patent Applications No. 2004-071038 filed on Mar. 12, 2004, No. 2004-097487 filed on Mar. 30, 2004, and No. 2004-198828 filed on Jul. 6, 2004, the disclosures of which are hereby incorporated herein by reference in their entirety.

BACKGROUND OF THE INVENTION

1. Field of the Invention

The invention relates to an image color adjusting technique.

2. Description of the Related Art

When images are taken using image-generating devices such as digital still cameras and video cameras, the entire image is processed by what is referred to as color balancing. The color balancing technique is disclosed, for example, in JP3469305B, JP11-205806A, JP10-210494A, and JP2-128591A.

Color balancing is done to reduce colorcast in images in order to allow the photographed subject to be accurately reproduced in the original white color. Such color balancing is often done using white areas which are nearly achromatic, and is thus also referred to as white balancing.

However, the colors in the image can turn into various colors according to the colors of the photographed subject, and can also turn into various other colors (color cast) depending on the color of the light source. Thus, in color balancing, color deviation is evaluated using various colored components which are nearly achromatic in order to reduce various types of colorcast. However, conventional color balancing has not taken into consideration the distribution of colors which are nearly achromatic in the processed image.

This problem is not limited to color balancing processes, but also pertains to processes for adjusting image colors.

Another problem concerning color balancing is that it is sometimes not possible to accurately reproduce the original colors no matter how much RGB color components is adjusted in order to compensate for light source differences.

SUMMARY OF THE INVENTION

A first object of the invention is to provide a technique for adjusting colors by taking into consideration the distribution of colors which are nearly achromatic.

A second object is to provide a technique for obtaining images with high picture quality by reproducing the original colors with high accuracy, even when images have been photographed under different light sources.

In a first aspect of the present invention, there is provided an image processing device for adjusting colors in an image targeted for processing, comprising: an achromatic-object color range selecting module configure to establish a plurality of achromatic-object color ranges each including some colors of an achromatic photographed object in the image targeted for processing, and to select at least one of the plurality of achromatic-object color ranges based on the image targeted for processing; and a color adjustment processing module configured to perform a color adjusting process on the image targeted for processing based on the selected achromatic-object color range.

This image processing device performs a color adjusting process according to the achromatic object color range which has been selected, on the basis of the image targeted for processing, from among a plurality of achromatic object color ranges, allowing colors to be adjusted by taking into consideration the distribution of colors which are nearly achromatic.

In a second aspect of the present invention, there is provided an image reproducing method of reproducing an image using color image data, comprising the steps of (1) generating the color image data by focusing a photographic image on detector elements to detect light intensity over a plurality of wavelength ranges; (2) acquiring illumination light source data, the illumination light source data being indicative of a type of an illumination light source used during shooting of the color image data;

(3) performing a color correction process of the color image data according to illumination light source associated with the color image data; and (4) reproducing an image using the color image data after the color correction, wherein the step (3) includes the steps of providing a plurality of correction parameters representing color correction associated with plural types of illumination light sources, respectively; and performing the color correction using a correction parameter selected based on the illumination light source data.

A second aspect of the invention is made upon the discovery that the inability to properly reproduce original colors despite the adjustment of RGB color components in order to compensate for differences in light source is caused by the following phenomena. Matters discovered by the inventors of the present application will be described first as a basis for explaining why the above effects are obtained by the image reproducing method in the second aspect of the invention.

Changes in the wavelength of light in the visible range are perceived by humans as changes in color. That is, it can be said that humans perceive the wavelength of light in the form of "color." However, humans do not necessarily perceive colors by detecting the light spectrum itself, and are believed to perceive colors by means of stimulus values after the light intensity distribution has been substituted by three independent stimulus values. The color-matching functions $x(\lambda)$, $y(\lambda)$, and $z(\lambda)$ shown in FIG. 32 are known values representing human characteristics. This can be considered to show the magnitude of the tristimulus values X, Y, and Z which are substituted for monochromatic light of a certain wavelength $\lambda$ unit intensity. The stimulus values X, Y, and Z of light that has a wavelength distribution rather than being monochromatic light are obtained by integrating the light spectrum, weighting the respective color-matching functions.

In photographing devices such as digital still cameras and video cameras, color filters are used to break the image down into R, G, B color components, and colors are represented with these color components. FIG. 33 schematically illustrates the standard spectral sensitivity characteristics of photographing devices such as digital still cameras. The curve shown by the dashed line indicates the spectral sensitivity characteristics of color component B, the curve shown by the solid line indicates the spectral sensitivity characteristics of color component G, and the curve shown by the dash-dot line indicates the spectral sensitivity characteristics of color component R. When light has a wavelength distribution, the R, G, and B color components can be obtained by integrating the light spectrum, weighting the respective spectral sensitivity characteristics.

When the stimulus values of X, Y, and Z are obtained by linear conversion of the resulting R, G, and B components (that is, when the Luther condition has been met), appropriate conversion to RGB output such as in digital cameras allows colors to be perceived exactly as humans do. Some cameras may approximately meet the Luther condition, as may be inferred from an actual comparison of the spectral sensitivity characteristics of the R, G, B color components in FIG. 33 and the color-matching functions x(λ), y(λ), and z(λ) in FIG. 32, which will show that they exhibit similar tendencies. The RGB components obtained by such digital cameras can thus be processed with certain conversion matrices and converted to XYZ stimulus values.

Some errors can occur in the conversion from RGB to XYZ when the photographing devices such as digital cameras do not strictly meet the Luther condition. Matrices which have been optimized so as to result in minimal conversion errors are thus used during the conversion. This optimization is done by specifying the illumination light source. Because the use of different illumination light sources will naturally cause the white balance to break down, the white balance is adjusted by adjusting the gain of the R, G, B components.

However, conversion errors result when the camera does not meet the Luther condition in the strict sense, and more significant conversion errors can occur when the gain of the RGB components is adjusted to restore the white balance. It is presumably for this reason that images under the influence of illumination light source cannot be completely corrected no matter how much the gain of the RGB output is adjusted.

In the second aspect of the invention, which is based on these findings, an image is reproduced after colors in the color image data photographed by digital cameras or the like is properly corrected according to the illumination light source. The colors of original images can thus be reproduced far more accurately by first converting coordinates according to the illumination light source in this way than by simply adjusting the RGB output gain.

In a third aspect of the present invention, there is provided an image reproducing method of reproducing a photographic image upon receipt of color image data produced by focusing the photographic image on detector elements, comprising the steps of (A) receiving illumination light source data, the illumination light source data being indicative of a type of an illumination light source used during shooting of the color image data; (B) performing a color correction process according to the illumination light source upon receipt of the color image data; and (C) reproducing an image using the color image data after the color correction, wherein the step (B) includes the steps of, providing a plurality of correction parameters representing color correction associated with plural types of illumination light sources, respectively; and performing the color correction of the color image data using a correction parameter selected based on the illumination light source data.

An image photographed using any illumination light source can thus be properly reproduced because the image is reproduced after colors in the color image data that has been generated are corrected according to the illumination light source.

In the image reproducing method of the second aspect and the third aspect, a plurality of conversion matrices for a linear conversion of the color image data may be provided as the correction parameters, and the linear conversion of the color image data using a conversion matrix selected based on the illumination light source data may be performed.

In the image reproducing method of the second aspect and the third aspect, a plurality of conversion tables may be provided as correction parameters, the plurality of conversion tables matching the generated color image data with image data that has undergone color correction according to the type of illumination light sources, and the color correction of the color image data by referencing a conversion table that has been selected on the basis of the illumination light source data may be performed.

The present invention can be comprehended as a image data output device of the following sort by taking note of the fact that image data is output according to the illumination light source. In a fourth aspect of the present invention, there is provided an image data output device of outputting color image data generated by focusing a photographic image on detector elements to detect light intensity over a plurality of wavelength ranges, comprising: a light source data acquisition module configured to acquire illumination light source data, the illumination light source data being indicative of a type of an illumination light source used during shooting of the color image data; a color correction module configured to perform a color correction process of the color image data according to the illumination light source data; an image data output module configured to output the color image data after the color correction, wherein the color correction module stores a plurality of correction parameters representing color correction associated with plural types of illumination light sources, respectively, and performs the color correction of the color image data using a correction parameter selected based on the illumination light source data.

In the image data output device of the fourth aspect, a plurality of conversion matrices for a linear conversion of the color image data may be provided as the correction parameters, and the linear conversion of the color image data using a conversion matrix selected based on the illumination light source data may be performed.

And the plurality of conversion matrices may include a predetermined standard conversion matrix, and the linear conversion of the color image data using the standard conversion matrix may be performed when no conversion matrix associated with the illumination light source data is available.

It is thus possible, and desirable, to preset a conversion matrix corresponding to the average illumination light source as the standard conversion matrix to allow images to be naturally reproduced without fail using image data obtained under any illumination light source.

In the image data output device of the fourth aspect, a plurality of conversion tables may be provided as correction parameters, the plurality of conversion tables matching the generated color image data with image data that has undergone color correction according to the type of illumination light sources, and the color correction of the color image data by referencing a conversion table that has been selected on the basis of the illumination light source data may be performed.

And the plurality of conversion tables may include a predetermined standard conversion table, and the color correction of the color image data by referencing the standard conversion table may be performed when no conversion table associated with the illumination light source data is available.

It is thus possible, and desirable, to preset a conversion table corresponding to the average illumination light source as the standard conversion table to allow images to be naturally reproduced without fail using image data obtained under any illumination light source.

The present invention can be comprehended as a image data output device of the following sort. In a fifth aspect of the present invention, there is provided an image data output device of outputting color image data generated by focusing a photographic image on detector elements to detect light intensity over a plurality of wavelength ranges, comprising:

a light source data acquisition module configured to acquire illumination light source data, the illumination light source data being indicative of a type of an illumination light source used during shooting of the color image data; a correction parameter storage configured to store a plurality of correction parameters for a color correction of the generated color image data, the plurality of correction parameters being associated with plural illumination light sources; an image data output module configured to select a correction parameter among the plurality of correction parameters based on the illumination light source data, and to output the generated color image data and the selected correction parameter, the generated color image data and the selected correction parameter being associated with each other.

The correction parameter can be written into the header of the image data, for example, and the color image data and correction parameter can be retrieved as a single datum, or they can be retrieved as separate data. When retrieved as separate data, the color image data and correction parameter can be related to each other in any form, such as methods in which they are retrieved continuously or a portion of the data name is shared.

In the image data output device of the fifth aspect, a plurality of conversion matrices for a linear conversion of the color image data may be provided as the correction parameters, and the linear conversion of the color image data using a conversion matrix selected based on the illumination light source data may be performed.

And the plurality of conversion matrices may include a predetermined standard conversion matrix, and the linear conversion of the color image data using the standard conversion matrix may be performed when no conversion matrix associated with the illumination light source data is available.

In the image data output device of the fifth aspect, a plurality of conversion tables may be provided as correction parameters, the plurality of conversion tables matching the generated color image data with image data that has undergone color correction according to the type of illumination light sources, and the color correction of the color image data by referencing a conversion table that has been selected on the basis of the illumination light source data may be performed.

And the plurality of conversion tables may include a predetermined standard conversion table, and the color correction of the color image data by referencing the standard conversion table may be performed when no conversion table associated with the illumination light source data is available.

The present invention can be comprehended as an image data output device of the following sort. In a sixth aspect of the present invention, there is provided an image data output device of outputting color image data generated by focusing a photographic image on detector elements to detect light intensity over a plurality of wavelength ranges, comprising:

a correction parameter storage configured to store a plurality of correction parameters for a color correction of the generated color image data according to an illumination light source of the photographic image; and an image data output module configured to output the color image data and the plurality of correction parameters, the color image data and the plurality of correction parameters being associated with each other.

The present invention can be comprehended as an image reproducing device of the following sort by taking note of the fact that image data is output according to the illumination light source. In a seventh aspect of the present invention, there is provided an image reproducing device of reproducing a photographic image upon receipt of color image data produced by focusing the photographic image on detector elements, comprising: a correction parameter receiving module configured to receive a plurality of correction parameters associated with the color image data, the plurality of correction parameters being for a color correction of the produced color image data according to an illumination light source used in shooting the photographic image; a color correction module configured to perform a color correction process of the color image data according to a correction parameter selected among the received plurality of correction parameters; and an image reproducing module configured to reproduce an image using the color image data after the color correction.

The photographer can thus select suitable correction parameters for more appropriate color correction of image data prepared under any illumination light source. Parameters which are different from the correction parameters suited for the illumination light source used to take the photographs can also be selected intentionally. Using the correction parameters selected in this manner to correct colors in the color image data and then using the resulting color image data to reproduce images will allow the expressive freedom of the images to be expanded and will allow images of higher quality to be reproduced.

The correction parameters can be written into the header of the image data, for example, and the color image data and correction parameter can be output as a single datum, or they can be output as separate data. Examples of methods that can be used for the output of separate data include continuous output, sharing portions of the data name, or linking the data to each other.

In the image data output device of the sixth aspect or the image reproducing device of the seventh aspect, the following correction parameters are preferably used. A plurality of conversion matrices for a linear conversion of the color image data may be provided as the correction parameters. And a plurality of conversion tables may also be provided as correction parameters, the plurality of conversion tables matching the generated color image data with image data that has undergone color correction according to the type of illumination light sources.

The invention can be worked in a variety of ways, such as an image processing method and image processing device, computer programs for executing the functions of such methods and devices, and recording media on which such computer programs are recorded.

These and other objects, features, aspects, and advantages of the present invention will become more apparent from the following detailed description of the preferred embodiments with the accompanying drawings.

BRIEF DESCRIPTION OF THE DRAWINGS

FIGS. 19(a)-19(b) schematically illustrate the creation of CCD output of RGB colors from a single CCD output by color interpolation in a image data output device;

FIG. 21 illustrates a color conversion matrix for converting XYZ color space image data to sRGB color space data;

FIG. 25 schematically illustrates color conversion matrices for various illumination light sources;

DESCRIPTION OF THE PREFERRED EMBODIMENTS

Embodiments of the invention are illustrated by examples in the following order.

A. Structure of Device

B. First Embodiment

C. Second Embodiment

D. Third Embodiment

E. Fourth Embodiment

F. Fifth Embodiment

G. Sixth Embodiment

H. Seventh Embodiment

I. Eighth Embodiment

J. Variants

A. Structure of Device

Figure 1:
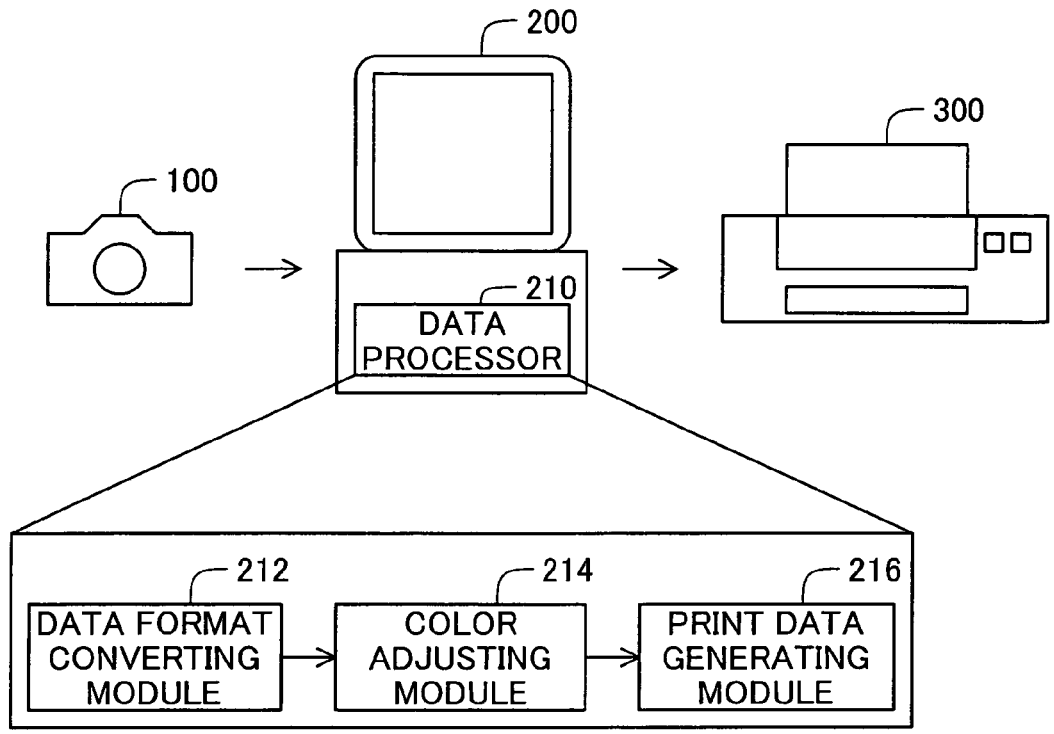
FIG. 1 illustrates the structure of an image processing system in an embodiment of the invention.

FIG. 1 illustrates the structure of an image processing system in an embodiment of the invention. This system comprises a digital camera 100 as the image producing device, a computer 200 as the image processing device, and a printer 300 as the image output device. The computer 200 comprises a data processor 210. The data processor 210 comprises a CPU and memory, and can carry out a variety of functions by running computer programs. In the embodiment in FIG. 1, the data processor 210 has the functions of a data format converting module 212, color adjusting module 214, and print data generating module 216.

The data format converting module 212 converts the format of the input image data (not shown) to a format suitable for processing by the color adjusting module 214. For example, the color adjusting module 214 can be used to run a process on RGB image data. The data format converting module 212 converts the RAW image data to RGB image data when RAW image data created by a digital camera 100 is used as the input image data. When JPEG image data created by a digital camera 100 is used as the input image data, the JPEG image data is decompressed and converted to RGB image data. The process for converting RAW image data or JPEG image data to RGB image data can be managed with well known methods, and will therefore not be further elaborated here. Various other types of formats can be employed for the image data used by the color adjusting module 214 and the input image data.

The color adjusting module 214 runs a process for adjusting the color of the image data targeted for processing (details given below).

The print data generating module 216 creates print data usable by the printer 300 based on the image data processed by the color adjusting module 214, and feeds the print data to the printer 300. Specifically, the processed image data is converted to data on the amount of ink usable by the printer 300 (such as CMYK ink amount data), and carries out a half tone process on each ink to produce dot formation data indicative of a dot forming state for each print pixel. The print data generating module 216 also arranges the dot formation data and generates print data.

The print data generating module 216 functions are implemented by a print driver. The data format converting module 212 and the color adjusting module 214 are implemented by an image processing application. Alternatively, the data format converting module 212, color adjusting module 214, and print data generating module 216 may be implemented by the printer driver.

A program for executing such printer driver and image processing application functions can be provided in a form that is recorded on computer-readable recording media. Examples of such recording media include various types of computer-readable media, such as floppy disks, CD-ROM, optoelectrical disks, IC cards, ROM cartridges, printed objects on which symbols have been printed such as punch cards and bar codes, internal storage devices for computers (memory such as RAM or ROM), and external storage devices.

B. First Embodiment

Figure 2:
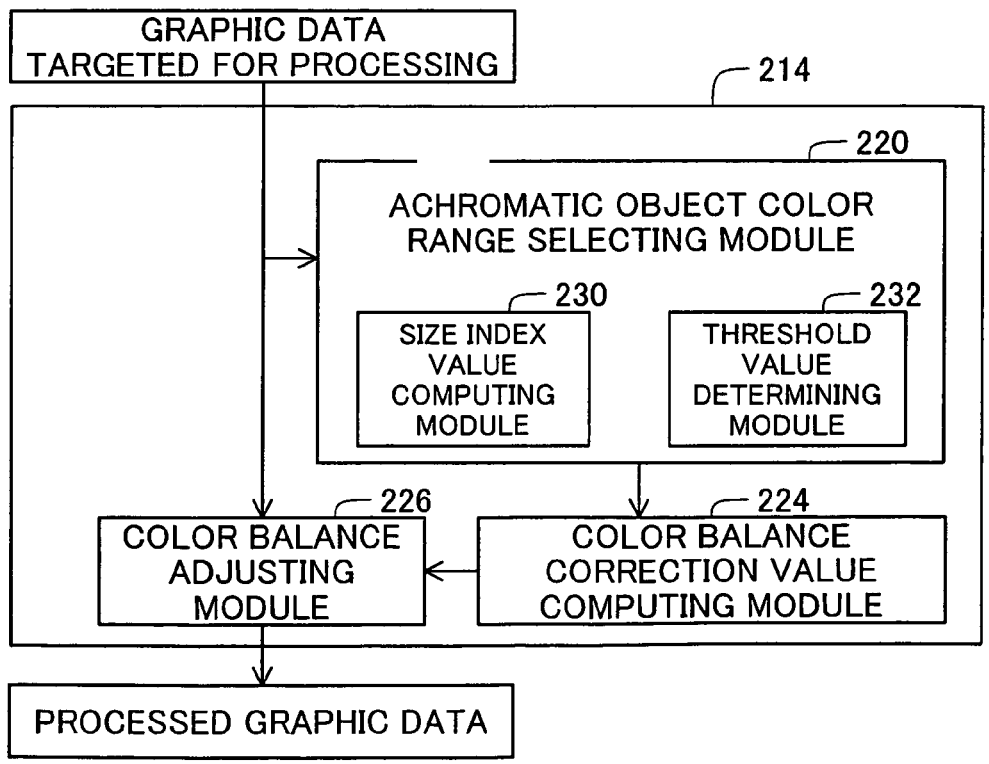
FIG. 2 is a block diagram of the internal structure of a color adjusting module 214 in the first embodiment.

FIG. 2 is a block diagram of the internal structure of the color adjusting module 214 in the first embodiment. The color adjusting module 214 in the first embodiment comprises an achromatic object color range selecting module 220, color balance correction value computing module 224, and color balance adjusting module 226. The achromatic object color range selecting module 220 comprises a size index value computing module 230 and threshold value determining module 232. The color balance correction value computing module 224 and color balance adjusting module 226 correspond to the "color adjustment processing module" of the invention. In the first embodiment, the color adjusting module 214 adjusts the color balance of the image data targeted for processing.

Figure 3:
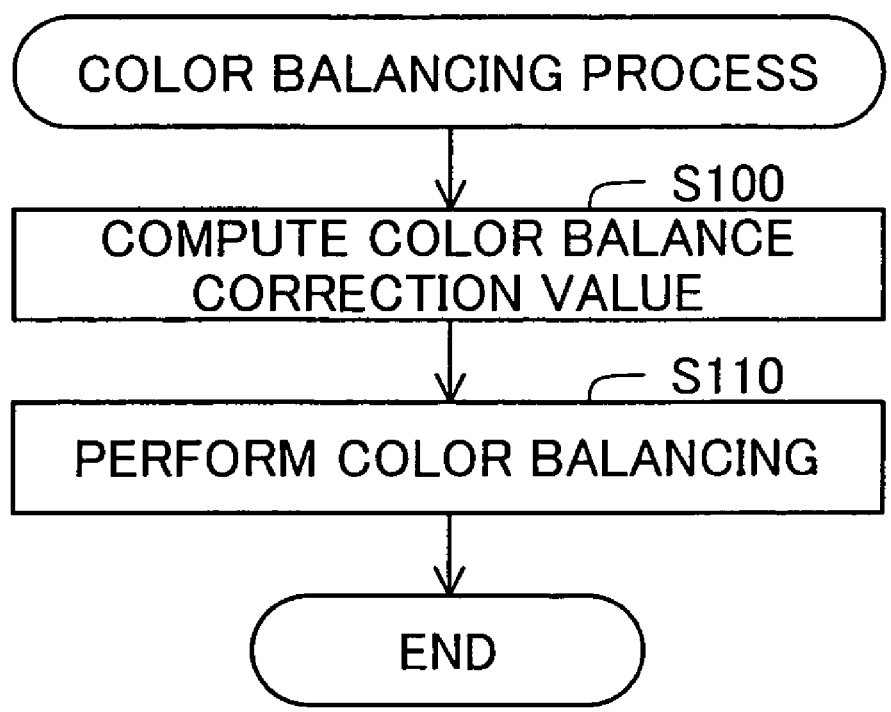
FIG. 3 is a flow chart of a procedure for a color balancing process.

FIG. 3 is a flow chart of the procedure in the color balancing process of the color adjusting module 214 (FIG. 2). In Step S100, the achromatic object color range selecting module 220 (FIG. 2) selects achromatic object color ranges which are to be used to calculate a color balance correction value. The color balance correction value computing module 224 calculates the color balance correction value using pixels in the selected achromatic object color ranges (referred to below as "selected achromatic object color pixels"). In the next Step S110, the color balance adjusting module 226 executes the color balance adjusting process based on the calculated color balance correction value.

Figure 4:
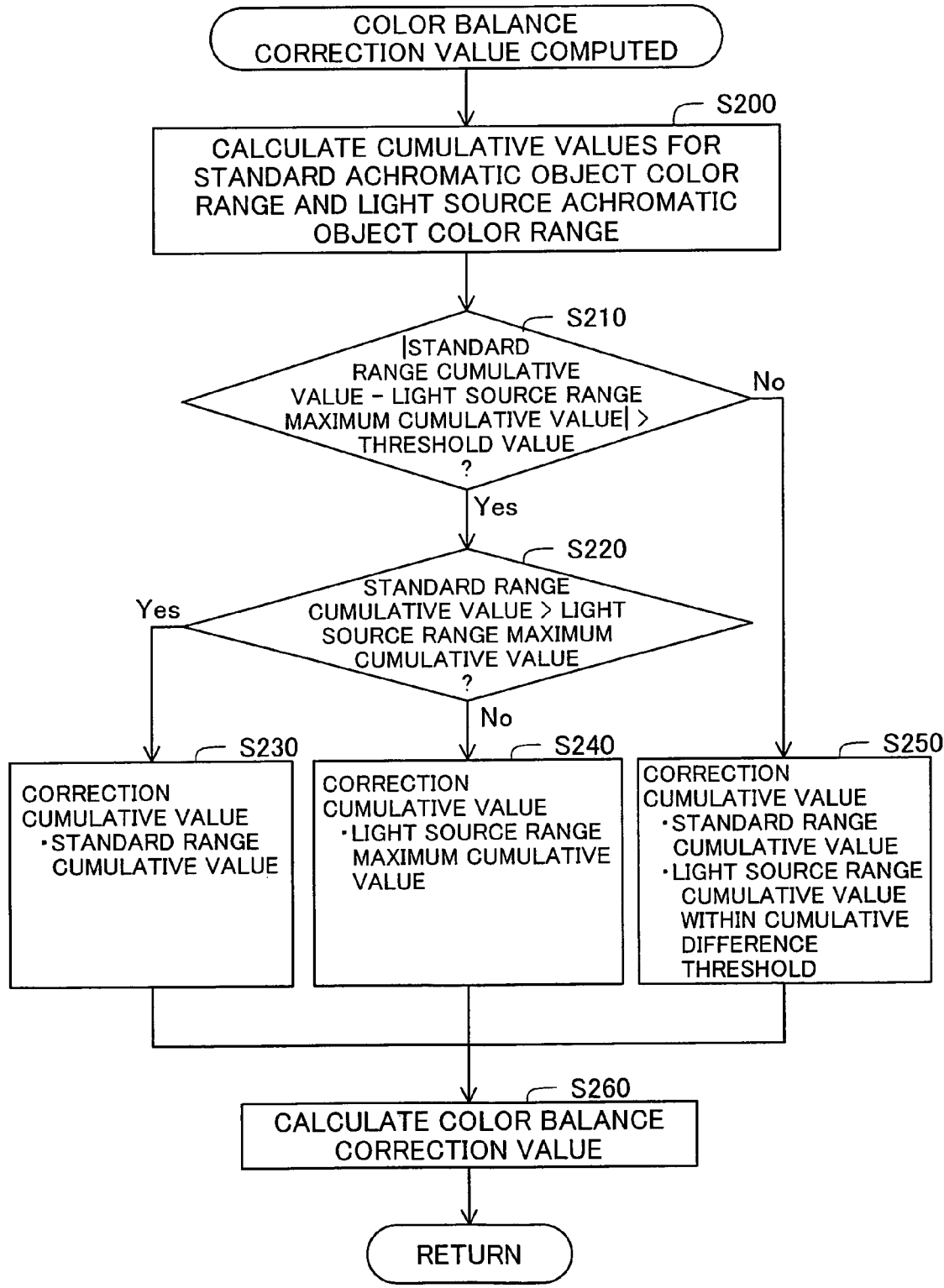
FIG. 4 is a flow chart of a procedure for a process to compute color balancing correction values.

FIG. 4 is a flow chart of the procedure in the process for calculating the color balance correction value. The process is run in Step S100 of FIG. 3. In the first Step S200, the size index value computing module 230 (FIG. 2) calculates a cumulative size value of each of a plurality of achromatic object color ranges using the pixel values of the image data targeted for processing. The cumulative size value, or pixel-number index value, represents the number of achromatic object color pixels in the image; the cumulative size value will be described later in detail.

Figure 5:
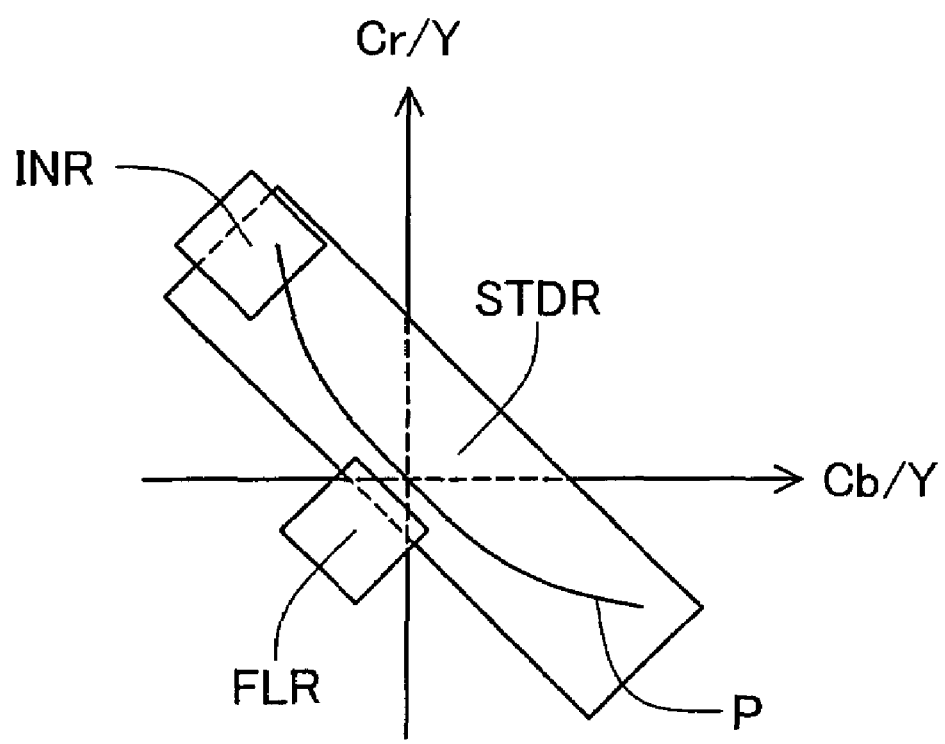
FIG. 5 illustrates an embodiment of an achromatic object color range.

FIG. 5 illustrates an example of the achromatic object color ranges. In the first embodiment, the achromatic object color ranges are established on a color space determined by the two parameters "Cr/Y" and "Cb/Y" using the three components of the YCbCr color system. In FIG. 5, the vertical axis indicates "Cr/Y," and the horizontal axis indicates "Cb/Y." The locus P in the figure indicates the Planckian locus (also referred to as the black body locus). The Planckian locus P follows the changes in black radiation color relative to changes in color temperature, and can also be considered to show the locus of colors exhibited by an achromatic object relative to changes in color temperature.

In the example of FIG. 5, a standard achromatic object color range STDR, fluorescent light range FLR, and incandescent light range INR have been established. The standard achromatic object color range STDR includes the Planckian locus P, and is established along the Planckian locus P. Thus, in this embodiment, the standard achromatic object color range STDR corresponds to the "locus achromatic object color range" in the invention.

The fluorescent light range FLR indicates the colors of light exhibited by fluorescent light, and is established so as not to include the Planckian locus P. The fluorescent light range FLR extends to the outside of the standard achromatic object color range STDR, and includes colors outside the standard achromatic object color range STDR. The fluorescent light range FLR thus corresponds to the "non-locus achromatic object color range" in the invention.

The incandescent light range INR indicates the colors of light exhibited by incandescent light. The incandescent light range INR also includes colors outside the standard achromatic object color range STDR.

The fluorescent light range FLR and incandescent light range INR are color ranges indicating the colors of specific light sources. These two achromatic object color ranges are hereinafter referred to as the "light source achromatic object color ranges."

The above plurality of types of achromatic object color ranges are preset in the achromatic object color range selecting module 220 (FIG. 2). In the first embodiment, the partial areas of the non-locus achromatic object color ranges (incandescent light range INR and fluorescent light range FLR in FIG. 5) which overlap the standard range STDR are excluded from the standard range STDR. Alternatively, there may be some overlapping between the standard range STDR and the other achromatic object color ranges, or overlapping ranges may be excluded from the other achromatic object color ranges. The standard range STDR and other achromatic object color ranges need not partially overlap each other, and may either overlap not at all or be separate from each other.

Figure 6A:
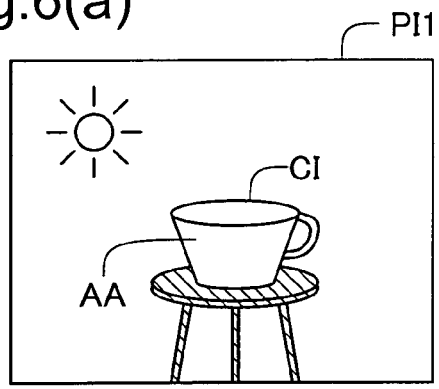
FIGS. 6(*a*)-6(*f*) illustrate an example of the relationship between an image targeted for processing and achromatic object color ranges.
Figure 6B:
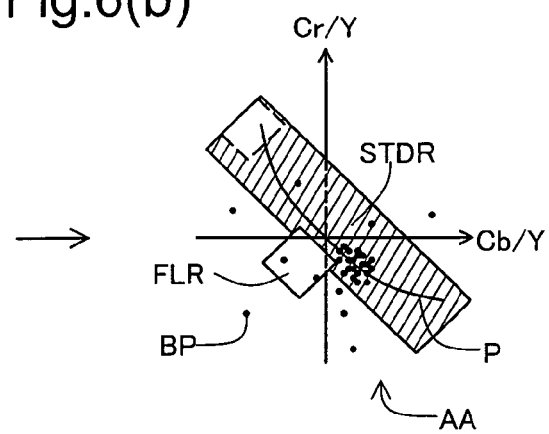
Figure 6C:
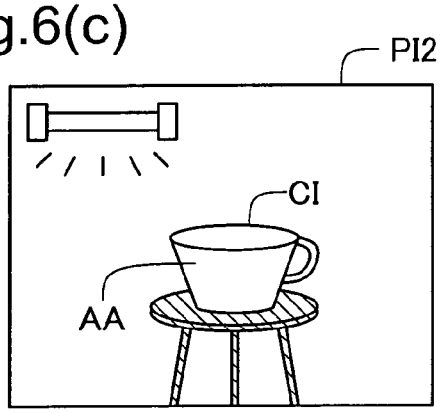
Figure 6D:
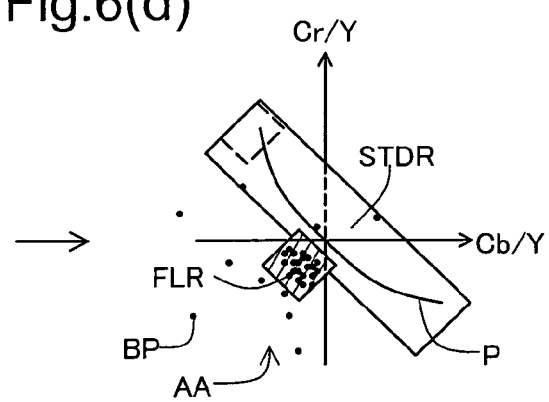
Figure 6E:
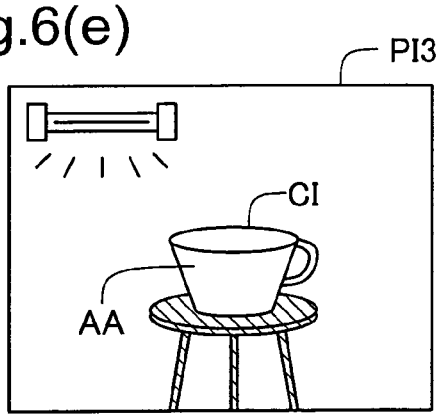

FIGS. 6(a)-6(f) illustrate an example of the relationship between an image targeted for processing and achromatic object color ranges. Images PI1 through PI3 which are targeted for processing are shown in FIGS. 6(a), 6(c), and 6(e). The same white cup CI is used as the photographed subject in the images PI1 through PI3 targeted for processing, but the light source is different in each. The first image PI1 is photographed in sunlight, the second image PI2 is photographed in fluorescent lighting, and the third image PI3 is photographed in fluorescent light in which the color of the light was similar to sunlight.

Figure 6F:
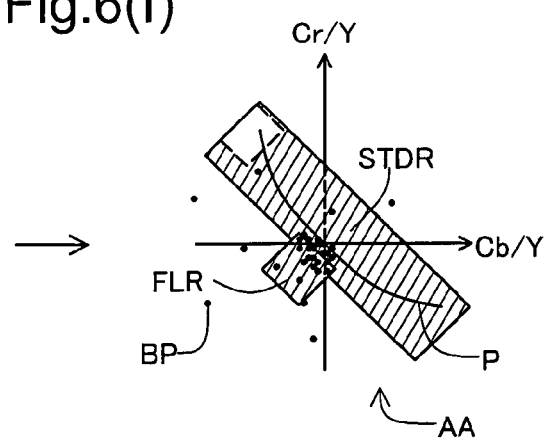

The distribution of pixels in the three images PI1 through PI3 are shown in FIGS. 6(b), 6(d), and 6(f). In these figures, the vertical axis indicates "Cr/Y" and the horizontal axis indicates "Cb/Y" in the same manner as in FIG. 5. Pixels contained in the image targeted for processing are represented by black or solid points BP. FIGS. 6(b), 6(d), and 6(f) only show nearly achromatic color ranges, and the pixels of the white area AA of the white cup CI are thus primarily shown. The standard achromatic object color range STDR and the fluorescent color range FLR are also shown in the figures. In the following description, the images PI1 through PI3 targeted for processing contain no pixels with colors in the incandescent light range INR (FIG. 5).

In Step S200 of FIG. 4, the size index value computing module 230 (FIG. 2) calculates the cumulative size values for the standard achromatic object color range STDR and the two light source achromatic object color ranges FLR and INR, respectively, that is, for all the achromatic object color ranges. Specifically, the size index value computing module 230 first selects pixels having the colors of the achromatic object color ranges (referred to below as "achromatic object color pixels") from among the pixels contained in the image targeted for processing, and integrates the RGB values of the achromatic object color pixels with respect to each achromatic object color range. The cumulative RGB color values SumR, SumG, and SumB according to (1a) through (1c) below are thus calculated for each achromatic object color range.

$$SumR = \Sigma Ri \qquad (1a)$$

$$SumG = \Sigma Gi \qquad (1b)$$

$$SumB = \Sigma Bi \quad (1c)$$

Ri, Gi, and Bi are the gray scale levels of each color component. Σ means that the sum is taken for all achromatic object color pixels. The gray scale levels of YCbCr color components are also calculated from the pixel values of each pixel when the achromatic object color pixels are selected. Several equations can be used to calculate the gray scale levels of the color components (Y, Cb, Cr). For example, the color conversion equations for the RGB and YCbCr color systems used in JPEG compression/extension can be employed.

The size index value computing module 230 calculates the total of the cumulative color component values (SumR+ SumG+SumB) as the cumulative size value, or pixel-number index value. The resulting cumulative size value tends to be greater the greater the number of achromatic object color pixels in the image targeted for processing, and can thus be used as an index of the size of the pixel numbers. That is, the cumulative size value corresponds to the "size index value" or the "population index value" in the invention.

The number of pixels included in a particular achromatic object color range can be used as the size index value for the color range, instead. The reason why the cumulative size value is used as the size index value instead of the number of achromatic object color pixels is because the cumulative value for each color component (SumR, SumG, SumB) calculated here can be used to calculate the color balance correction values described below.

In the image PI1 targeted for processing in FIG. 6(a), the colors are biased toward the colors of sunlight, and the pixels of the white area AA as shown in FIG. 6(b) are thus distributed primarily in the standard achromatic object color range STDR. As a result, the greatest number of pixels is in the standard range STDR. A relatively large cumulative size value is thus obtained for the standard range STDR, and a relatively smaller cumulative size value is obtained for the fluorescent light range FLR. The result is 0 for the incandescent range INR (not shown) (the same is true for the other images PI2 and PI3 targeted for processing).

In the image PI2 targeted for processing shown in FIG. 6(c), the colors are biased to fluorescent light colors, and the pixels of the white area AA as illustrated in FIG. 6(d) are distributed primarily in the fluorescent light range FLR. As a result, the greatest number of pixels is in the fluorescent light range FLR. A relatively large cumulative size value is thus obtained for the fluorescent light range FLR, and a relatively smaller cumulative size value is obtained for the standard achromatic object color range STDR.

In the image PI3 targeted for processing shown in FIG. 6(e), the colors are biased to fluorescent light colors similar to the colors in sunlight, and the pixels of the white area AA as illustrated in FIG. 6(f) are distributed primarily near the border between standard range STDR and the fluorescent light range FLR. As a result, the same number of pixels are in the standard range STDR and the fluorescent light range FLR. About the same cumulative size value is thus obtained for the standard range STDR and the fluorescent light range FLR.

Next, in Step S210 (FIG. 4), the achromatic object color range selecting module 220 compares the cumulative size values. Specifically, the standard range cumulative value and the light source range maximum cumulative value are compared. The "standard range cumulative value" is the cumulative size value of the standard achromatic object color range STDR. The light source range maximum cumulative value is the largest cumulative size value of the light source achromatic object color ranges.

In Step S210, the threshold value determining module 232 (FIG. 2) first determines a threshold value of the cumulative size value. In the first embodiment, the threshold value is obtained by multiplying the standard range cumulative value by a certain proportion (such as 10%). Various values calculated on the basis of the standard range cumulative value can be used as the threshold value. For example, the square root of the standard range cumulative value may be used as the threshold value. However, the threshold value is preferably greater than 0, and is preferably a value that is greater, the greater the standard range cumulative value.

The achromatic object color range selecting module 220 then determines whether or not the light source range maximum cumulative value and the standard range cumulative value meet the following differential condition A, according to the threshold value.

Differential condition A: the absolute difference between the light source range maximum cumulative value and the standard range cumulative value is greater than the threshold value.

For example, in the example in FIG. 6(a), since there are no pixels with colors of the incandescent light range INR in the image targeted for processing, the cumulative size value in the fluorescent light range FLR will be the light source range maximum cumulative value. Pixels are also concentrated in the standard achromatic object color range STDR, and the cumulative size value in the fluorescent light range FLR (light source range maximum cumulative value) is lower than the value obtained by subtracting the threshold from the standard range cumulative value. The above differential condition A is therefore met (FIG. 4: Step S210: yes).

In the example in FIGS. 6(c) and 6(d), the cumulative size value of the fluorescent light range FLR is the light source range maximum cumulative value. The pixels are concentrated in the fluorescent light range FLR, and the cumulative size value in the fluorescent light range FLR (light source range maximum cumulative value) is greater than the value obtained by adding the threshold to the standard range cumulative value. The above differential condition A is therefore met (FIG. 4: Step S210: yes).

In the example in FIGS. 6(e) and 6(f), on the other hand, the cumulative size of the fluorescent light range FLR is the light source range maximum cumulative value. About the same number of pixels is distributed in the fluorescent light range FLR and standard achromatic object color range STDR, and the absolute value of the difference between the light source range maximum cumulative value and the standard range cumulative value is not greater than the threshold value. The differential condition A is therefore not met (Step S210: no).

When the above differential condition A is met (FIG. 4: Step S210: yes), in the next Step S220 the achromatic object color range selecting module 220 determines which of the standard range cumulative value and the light source range maximum cumulative value is greater.

When the standard range cumulative value is greater than the light source range maximum cumulative value (Step S220: yes), in the next Step S230 the achromatic object color range selecting module 220 selects only the standard achromatic object color range STDR. In this case, the standard range cumulative value has the greatest cumulative size value among all the achromatic object color ranges. The achromatic object color range selecting module 220 thus selects only the achromatic object color range STDR having the largest cumulative size value.

The color balance correction value computing module 224 uses the RGB color cumulative values SumR, SumG, and SumB of the selected range STDR as the correcting cumulative values CSumR, CSumG, and CSumB. The correcting cumulative values are used to calculate the color balance correction value (details below).

In the example in FIGS. 6(a) and 6(b), for instance, since the standard range cumulative value is greater than the light source range maximum cumulative value (the cumulative size value of the fluorescent light range FLR) (FIG. 4: Step S220: yes), only the standard range STDR is selected (indicated by shaded area in FIG. 6(b)). The RGB color cumulative values SumR, SumG, and SumB of the standard range STDR are also used as the correcting cumulative values CSumR, CSumG, and CSumB. In this case as well, the fluorescent light range FLR is not selected, even though pixels with the colors of the fluorescent light range FLR are in the image targeted for processing.

When, on the other hand, the light source range maximum cumulative value is greater than the standard range cumulative value (Step S220: no), in the next Step S240 the achromatic object color range selecting module 220 selects only the light source achromatic object color range with the largest cumulative size value. In this case, the light source range maximum cumulative value has the greatest cumulative size value among all the achromatic object color ranges. The achromatic object color range selecting module 220 thus selects only the achromatic object color range with the largest cumulative value. The color balance correction value computing module 224 also uses the RGB color cumulative values SumR, SumG, and SumB of the selected light source achromatic object color range as the correcting cumulative values CSumR, CSumG, and CSumB.

In the example in FIGS. 6(c) and 6(d), for instance, since the light source range maximum cumulative value (the cumulative size value of the fluorescent light range FLR) is greater than the standard range cumulative value (FIG. 4: Step S220: no), only the fluorescent light range FLR is selected (indicated by shaded area in FIG. 6(d)). The RGB color cumulative values SumR, SumG, and SumB of the fluorescent light range FLR are also used as the correcting cumulative values CSumR, CSumG, and CSumB. In this case as well, the standard range STDR is not selected, even though pixels with the colors of the standard range STDR are present in the image targeted for processing.

However, in images with colorcast, the colors of the entire image tend to be biased to certain colors (such as colors of the light source), resulting in a high possibility that pixels with colors in the achromatic object color range with particularly high cumulative size values will represent the photographed subject with its original achromatic colors which are deviated due to the color cast. These colors will be hereinafter referred to as "colorcast colors," which are often the same as the colors of the light source. Thus, only the achromatic object color range with the greatest cumulative size value is used to calculate the color balance correction value, making it possible to obtain the correction values which will properly reduce colorcast in the image targeted for processing.

When the differential condition A is not met, however (FIG. 4: Step S210: no), in the next Step S250 the achromatic object color range selecting module 220 selects the standard range STDR and the achromatic object color range with the cumulative size value close to the standard range cumulative value. Specifically, the achromatic object color range in which the absolute difference of the cumulative size from the standard range cumulative size is less than the aforementioned threshold value is selected. The achromatic object color range with the greatest cumulative size value is also included in the selected achromatic object color range. The color balance correction value computing module 224 integrates the RGB color cumulative values SumR, SumG, and SumB of the selected achromatic object color range to obtain the correcting cumulative values CSumR, CSumG, and CSumB.

In the example in FIGS. 6(e) and 6(f), for instance, the absolute difference between cumulative size value of the fluorescent light range FLR (light source range maximum cumulative value) and the standard range cumulative value is less than the threshold. On the other hand, the cumulative size value of the incandescent light range INR is 0, and the absolute difference from the standard range cumulative value is greater than the threshold. As a result, the standard range STDR and fluorescent light range FLR are selected (indicated by shaded area in FIG. 6(f)). The RGB cumulative values SumR, SumG, and SumB of these two achromatic object color ranges STDR and FLR are added to obtain the correcting cumulative values CSumR, CSumG, and CSumB.

As noted above, in images with colorcast, the possibility that the colors of the achromatic object color range are resulted from deviation from original achromatic colors depends on the cumulative size value. The achromatic object color range which may include colors deviated from original achromatic colors can be selected by selecting the achromatic object color range having a cumulative size value close to the standard range cumulative value. It is thus possible to calculate the color balance correction value, giving weight to the standard achromatic object color range colors.

As noted above, the achromatic object color range selecting module 220 (FIG. 2) selects the achromatic object color range based on the image targeted for processing, and when the color balance correction value computing module 224 computes the correcting cumulative values CSumR, CSumG, and CSumB, in the next Step S260 (FIG. 4) the color balance correction value computing module 224 calculates the three color balance correcting values AWB_R, AWB_B, and AWB_G using the correcting cumulative values CSumR, CSumG, and CSumB. In the first embodiment, the color balance correcting values AWB_R, AWB_B, and AWB_G are calculated according to the following Equations (2a) through (2c).

$$AWB\_R = CSumG/CSumR \tag{2a}$$

$$AWB\_G = CSumG/CSumG = 1.0 \tag{2b}$$

$$AWB\_B = CSumG/CSumB \tag{2c}$$

The three color balance correcting values (AWB_R, AWB_B, and AWB_G) are thus obtained by dividing the G component correcting cumulative value (CSumG) by the respective correcting cumulative values (CSumR, CSumG, and CSumB) for the RGB color components. This shows the deviation between the color represented by the cumulative values of the color components in the selected achromatic object color pixels and the achromatic colors having the G component values. The color balance of the entire processed image can thus be properly adjusted by color balancing the entire image targeted for processing using the correcting values (AWB_R, AWB_B, and AWB_G) given by Equations (2a) through (2c).

When the color balance correcting values (AWB_R, AWB_B, and AWB_G) are calculated, in the next Step S110 (FIG. 3) the color balance adjusting module 226 (FIG. 2) does the color balancing, producing processed image data.

Figure 7:
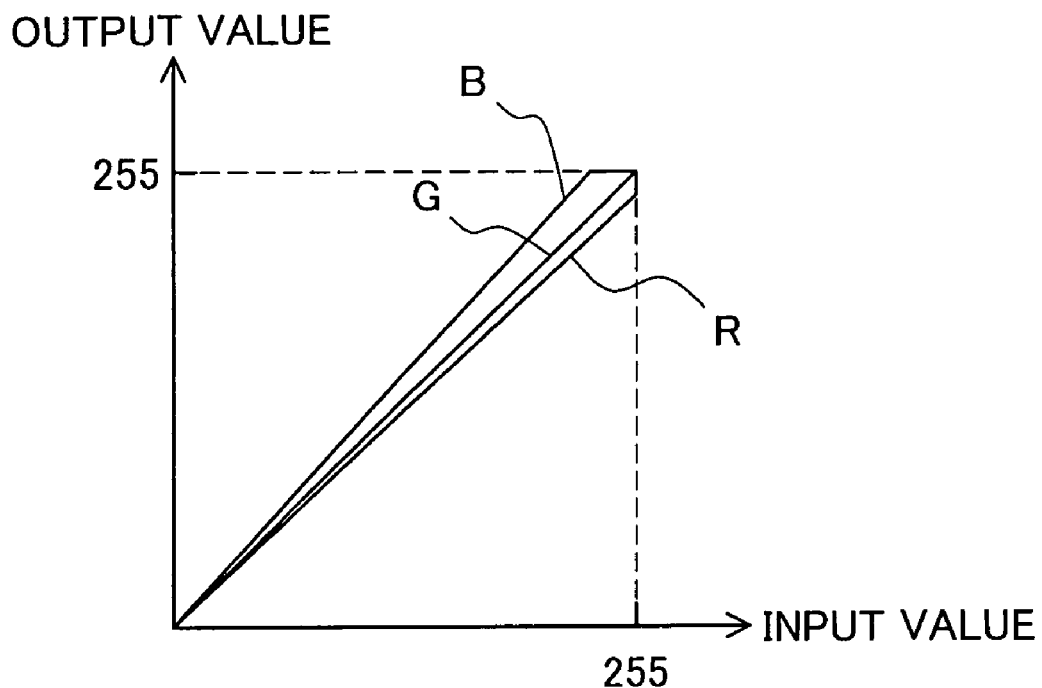
FIG. 7 illustrates details of color balancing.

FIG. 7 illustrates an example of a graph of the details of color balancing, and an example of various color balancing parameters. Color balancing is a process in which the gray scale is corrected for the RGB color components of the image data targeted for processing. In the first embodiment, the gray scale levels Rout, Gout, and Bout of the color components in the processed image data are calculated according to the following Equations (3a) through (3c).

$$Rout = AWB\_R \times Rin \quad (3a)$$

$$Gout = AWB\_G \times Gin = Gin \quad (3b)$$

$$Bout = AWB\_B \times Bin \quad (3c)$$

Rin, Gin, and Bin are the gray scale levels of the color components in the image data targeted for processing. Thus, in the first embodiment, the gray scale levels (Rout, Gout, and Bout) in the processed image data are obtained by multiplying the color component correction values by the original gray scale level (Rin, Gin, Bin). In the first embodiment, the correction values of the color components are established based on the G component, and the gray scale level of the G component is thus about the same before and after the adjustment.

As noted above, according to the first embodiment, because some of the plurality of types of achromatic object color ranges are used to obtain the color balance correction values according to the cumulative size value of each achromatic object color range, color balancing can be properly done taking into consideration the distribution of colors that are nearly achromatic.

Incidentally, the achromatic object color ranges preferably include various colors in order to reduce various types of color cast. Yet, if the achromatic object color ranges are expanded too much, pixels whose original colors are far from achromatic colors will be used to calculate the color balance correction values, resulting in a greater possibility of not being able to properly reduce colorcast in images targeted for processing. In the first embodiment, a plurality of types of achromatic object color ranges (the standard achromatic object color range STDR, incandescent light range INR, and fluorescent light range FLR in the embodiment in FIG. 5) are established as achromatic object color ranges. It is thus possible to use pixels with various colors to calculate the color balance correction values without excessively expanding the achromatic object color ranges.

C. Second Embodiment

Figure 8:
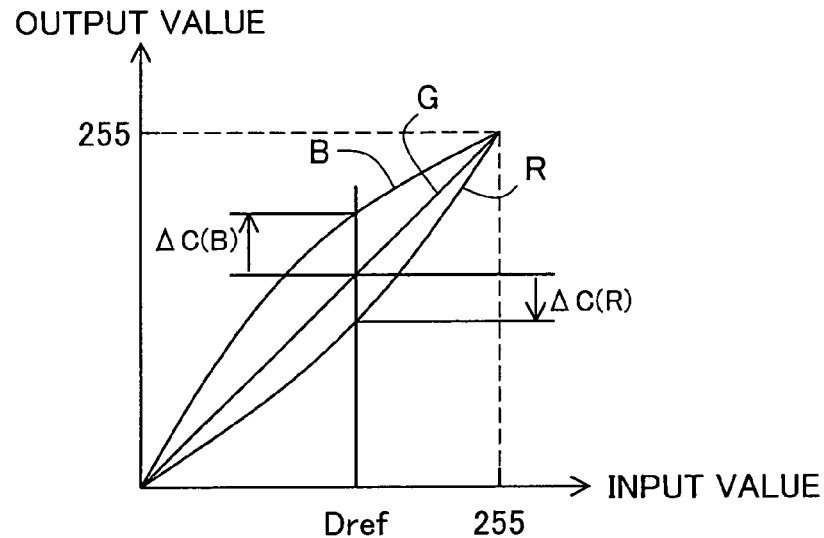
FIG. 8 illustrates details of color balancing in a second embodiment.

FIG. 8 illustrates details of color balancing in a second embodiment. The difference from the first embodiment shown in FIG. 7 is that tone curve correction is done for the RGB color components of the image data targeted for processing. The structure and operation are otherwise the same as in the first embodiment.

In the second embodiment, the color balance correction value computing module 224 uses the correction values (AWB_R, AWB_B, and AWB_G) calculated in the procedure described above to calculate the tone curve correction values ΔC(R), ΔC(G), and ΔC(B) according to the following Equations (4a) through (4c).

$$\Delta C(R) = Ka \times (AWB\_R - 1.0) \quad (4a)$$

$$\Delta C(G) = Ka \times (AWB\_G - 1.0) = 0.0 \quad (4b)$$

$$\Delta C(B) = Ka \times (AWB\_B - 1.0) \quad (4c)$$

Here, Ka is a certain coefficient. The tone curve correction values ΔC(R), ΔC(G), and ΔC(B) denote the extent of correction by which an output value for a reference input value Dref is corrected from the non-correction properties. The average luminance values of the aforementioned selected achromatic object color pixels can be used as the reference input value Dref, for example, or a certain constant value (such as 192) can be used instead. In the embodiment in FIG. 8, ΔC(R), ΔC(G), and ΔC(B) against the reference input Dref are calculated for the RGB color components, respectively, to determine the shape of the tone curves of each color component. Other methods for establishing the tone curves may be used, instead.

In the second embodiment, the correction values for the color components are established based on component G, and the gray scale level of component G is therefore the same before and after adjustment. A value that does not result in excessive color balancing is preferably used as the coefficient Ka. A value determined on the basis of an sensory evaluation of the results of image adjustment may also be used. In this embodiment, the tone curve correction values can be considered to correspond to the "color balance correction value" or "color balance adjustment value" in the invention.

Thus, in the second embodiment, a variety of types of achromatic object color ranges are used to obtain the color balance correction values according to the cumulative size value of each achromatic object color range, allowing color balancing to be properly done by establishing tone curves for each color component.

D. Third Embodiment

Figure 9:
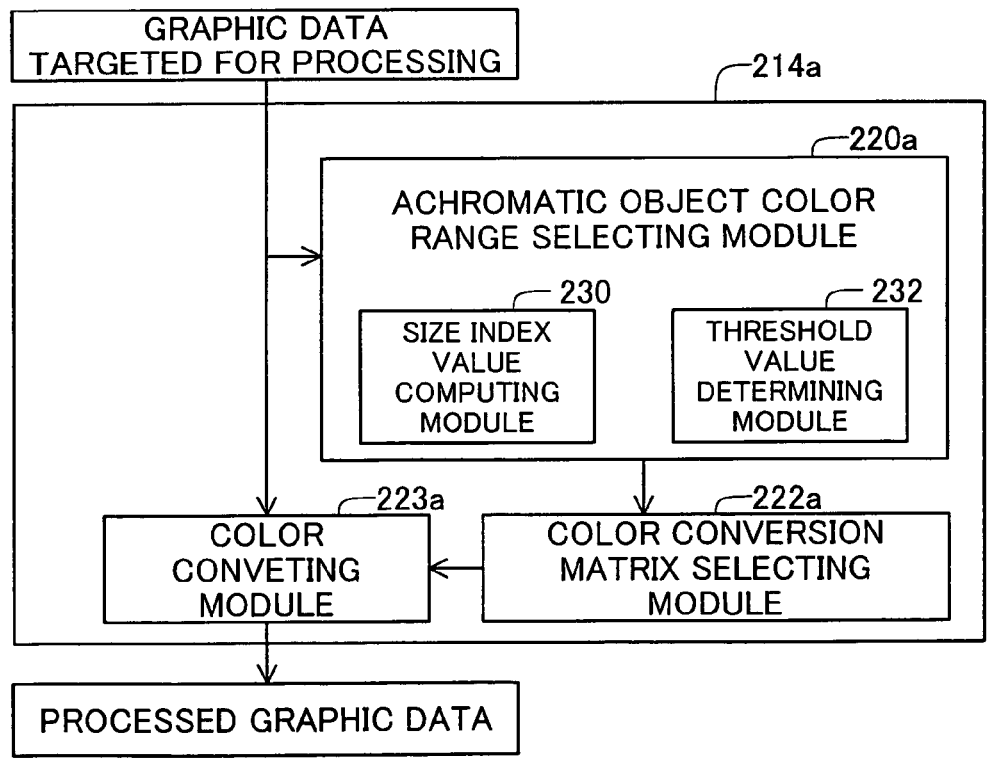
FIG. 9 is a block diagram of the internal structure of the color adjusting module 214*a* in a third embodiment.

FIG. 9 is a block diagram of the internal structure of the color adjusting module 214a in the third embodiment. This differs in two ways from the first embodiment shown in FIG. 2. One difference is that a color conversion matrix selecting module 222a and color converting module 223a are provided instead of the color balance correction value computing module 224 and color balance adjusting module 226. Another difference is that the processing details of the achromatic object color range selecting module 220a are different from those of the achromatic object color range selecting module 220 in the first embodiment. Unlike the first embodiment in FIG. 2, the color adjusting module 214a executes a color conversion process on the image data targeted for processing. The structure and operation are otherwise the same as in the first embodiment. The color conversion matrix selecting module 222a and color converting module 223a also correspond to the "color adjustment processing module" in the invention.

Figure 10:
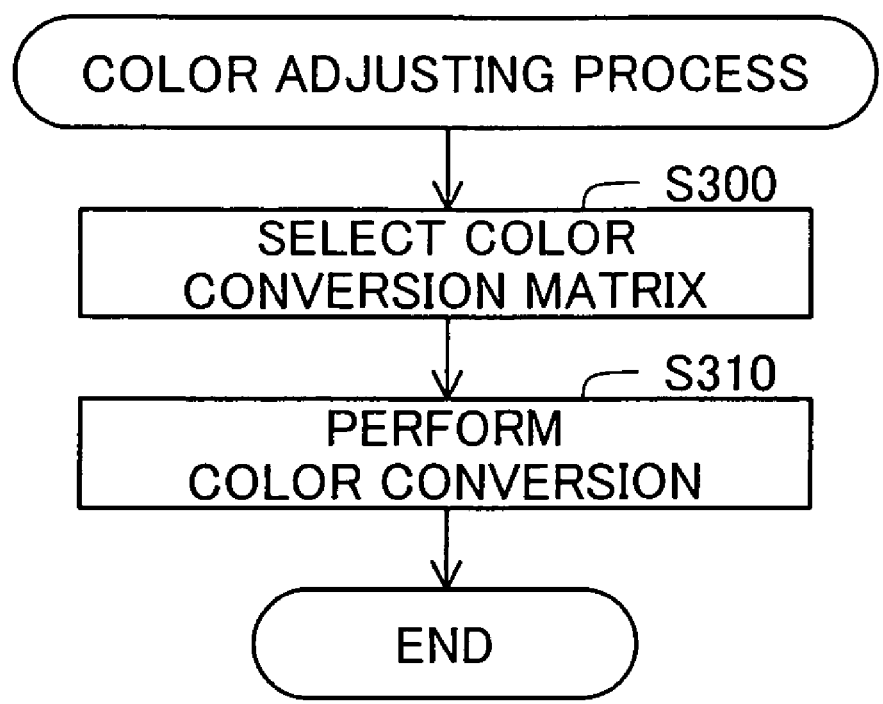
FIG. 10 is a flow chart of a procedure for a color adjustment process.

FIG. 10 is a flow chart of a procedure for the color adjustment process in the color adjusting module 214a (FIG. 9). In Step S300, the achromatic object color range selecting module 220a selects an achromatic object color range that will be used to select the color conversion matrix. The color conversion matrix selecting module 222a also selects a color conversion matrix according to the selected achromatic object color range. In the next Step S310, the color converting module 223a runs the color conversion process using the selected color conversion matrix, and produces processed image data.

The color conversion matrix represents correspondence between the pixel values of the image data targeted for processing (such as YCbCr or RGB color component gray scale levels) and the pixel values of the processed image data (such as RGB color component gray scale levels). Here, the color conversion process run by the color converting module 223a can be referred to as a process for adjusting image colors according to the color conversion matrix. The color component types of the image data targeted for processing and the color component types of the processed image data are selected in advance. Various color component types can be used for the color conversion or color correction matrix.

In the third embodiment, a color conversion matrix is established for each achromatic object color range. Such a plurality of color conversion matrices are preset in the color conversion matrix selecting module 222a. The achromatic object color range selecting module 220a selects one achromatic object color range according to the image data targeted for processing. As a result, one color conversion matrix is selected according to the image data targeted for processing.

Figure 11:
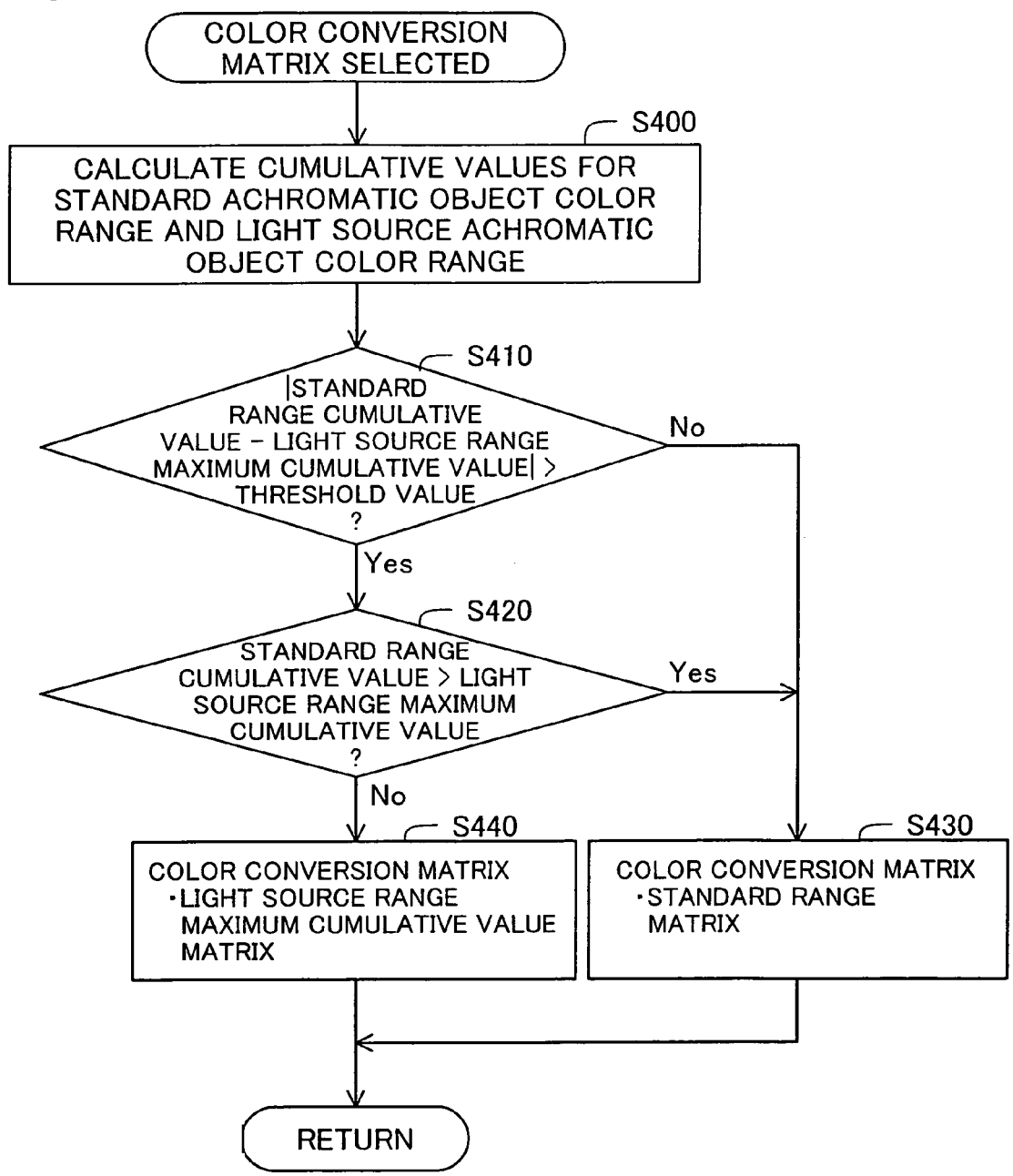
FIG. 11 is a flow chart of a procedure for the process of selecting a color conversion matrix.

FIG. 11 is a flow chart of a procedure for the process of selecting a color conversion matrix. Steps S400, S410, and S420 correspond to Steps S200, S210, and S220, respectively, in FIG. 4.

When the cumulative size values of the achromatic object color ranges have been calculated in Step S400, in the next Step S410 the achromatic object color range selecting module 220a determines whether or not the aforementioned differential condition A is satisfied, or whether the absolute difference between the light source range maximum cumulative value and the standard range cumulative value is greater than the threshold value.

When the differential condition A is not met (FIG. 11: Step S410: no), in the next Step S430 the achromatic object color range selecting module 220a selects the standard achromatic object color range STDR. The color conversion matrix selecting module 222a also selects the standard color conversion matrix associated with the standard range STDR. For instance, in the example in FIGS. 6(e) and 6(f), the standard color conversion matrix is selected because the differential condition A is not met.

When the differential condition A is met (Step S410: yes), in the next Step S420 the achromatic object color range selecting module 220a determines which of the standard range cumulative value and the light source range maximum cumulative value is greater.

When the light source range maximum cumulative value is greater than the standard range cumulative value (Step S420: no), in the next Step S440 the achromatic object color range selecting module 220a selects the light source achromatic object color range having the maximum cumulative size value. The color conversion matrix selecting module 222a selects the color conversion matrix associated with the selected light source achromatic object color range.

For instance, in the example in FIGS. 6(c) and 6(d), the achromatic object color range selecting module 220a selects the fluorescent light range FLR. The color conversion matrix selecting module 222a thus selects the color conversion matrix associated with the fluorescent light range FLR. The color conversion matrix for the fluorescent light range FLR allows the colors of the fluorescent light range FLR after the color conversion process to be closer to achromatic colors compared to the standard color conversion matrix. In other words, the saturation of the colors in the fluorescent light range FLR after the color conversion process is lower. As a result, even when the image targeted for processing has colorcast, the color conversion process allows the colors of the pixels representing the photographed subject with the original saturation to be closer to achromatic colors. This is the same for the color conversion matrix of the incandescent light range INR.

When the standard range cumulative value is greater than the light source range maximum cumulative value (Step S420; yes), in the next Step S430 the achromatic object color range selecting module 220 selects the standard achromatic object color range STDR. The color conversion matrix selecting module 222a selects the color conversion matrix associated with the standard range STDR.

In the example in FIGS. 6(a) and 6(b), for instance, the achromatic object color range selecting module 220a selects the standard range STDR, and the color conversion matrix selecting module 222a thus selects the standard color conversion matrix associated with the standard range STDR.

Thus, in the third embodiment, when the light source range maximum cumulative value is greater than the standard range cumulative value by more than the threshold difference, that is, when the cumulative size value of the light source achromatic object color range is particularly high, the color conversion process is carried out using the color conversion matrix of the light source achromatic object color range with the greatest cumulative size value. When there is no achromatic object color range with a particularly high cumulative size value compared to the standard achromatic object color range, the color conversion process is carried out using the standard color conversion matrix. As a result, the image data after the color conversion process can restore nearly achromatic colors. In the third embodiment, the color conversion matrix corresponds to the "color conversion conditions" or "color conversion profile" of the invention.

In the third embodiment, the color conversion matrices for the light source achromatic object color ranges are set so that the saturation after the color conversion process of the colors in the light source achromatic object color ranges is lower than that obtained using the standard achromatic color conversion matrix. It is thus possible to produce processed image data with less colorcast.

The determinations in Steps S410 and S420 in FIG. 11 can also be described as follows. That is, the standard color conversion matrix of the standard range STDR is selected when the difference between the standard range cumulative value and the greatest value among the cumulative size values of the plurality of achromatic object color ranges is equal to or lower than the threshold difference. As a result, the standard color conversion matrix and other color conversion matrices can be selectively used according to the threshold difference. The threshold difference corresponds to the "standard threshold value" in the invention.

The color converting module 223a may also run other processes in addition to the process using color conversion matrices. It may also run gamma correction of gray scale levels, for example. In such cases, the gamma correction level used in gamma correction may be preset for each achromatic object color range. Here, the color converting module 223a may perform the gamma correction using the gamma coefficient of the selected achromatic object color range. In this case, the set of the color conversion matrix and the gamma coefficient corresponds to the "color conversion conditions" or "color correction conditions" of the invention. Each set of the color conversion conditions may be stored in a color conversion profile.

E. Fourth Embodiment

Figure 12:
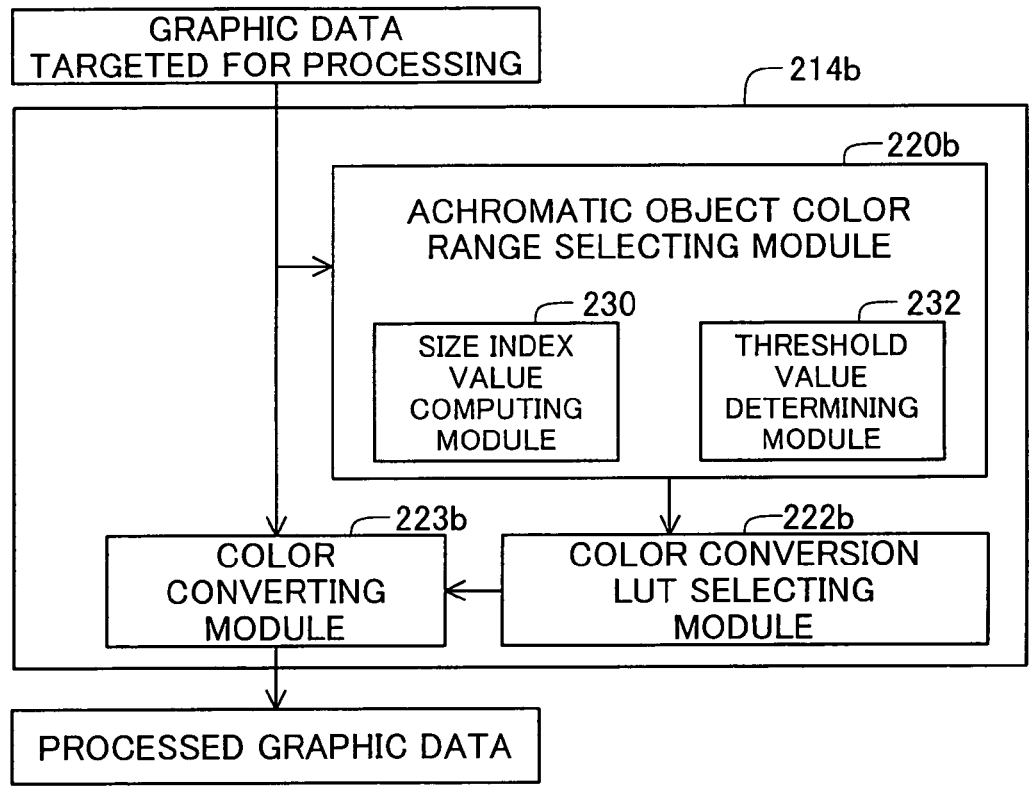
FIG. 12 is a block diagram of the internal structure of a color adjusting module 214b in a fourth embodiment.

FIG. 12 is a block diagram of the internal structure of the color adjusting module 214b in a fourth embodiment. The difference from the third embodiment in FIG. 9 is that a color conversion LUT selecting module 222b is provided instead of the color conversion matrix selecting module 222a. The color adjusting module 214b runs the color conversion process using color conversion look up tables (referred to as "color conversion LUT") instead of color conversion matrices. The structure and operations are otherwise the same as in the third embodiment.

Figure 13:
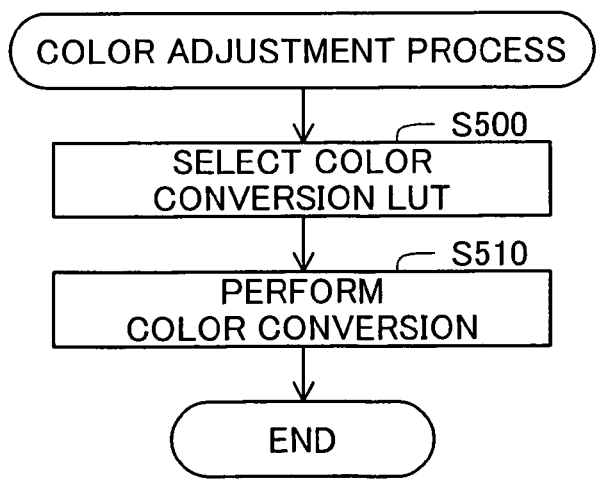
FIG. 13 is a flow chart of a procedure for a color adjustment process.

FIG. 13 is a flow chart of a procedure for the color adjustment process in the color adjusting module 214b (FIG. 12). In Step S500, the achromatic object color range selecting module 220b selects an achromatic object color range to be used in the selection of the color conversion LUT. The color conversion LUT selecting module 222b also selects the color conversion LUT associated with the selected achromatic object color range. In the next Step S510, the color converting module 223b runs the color conversion process by referencing the selected color conversion LUT, producing processed image data.

The color conversion LUT represent correspondence between the pixel values of the image data targeted for processing (such as YCbCr or RGB color component gray scale levels) and the pixel values of the processed image data (such as RGB color component gray scale levels). Here, the color conversion process run by the color converting module 223b can be considered a process in which the image colors are adjusted according to the color conversion LUT. The color component types of the image data targeted for processing and those of the processed image data are selected in advance. Various color component types can be used for the color conversion LUTs.

In the fourth embodiment, color conversion LUT is established for each achromatic object color range in the same way as in the third embodiment. The plurality of color conversion LUT are preset in the color conversion LUT selecting module 222b. The color conversion LUT in the fourth embodiment are look up tables using three types of input values (such as YCbCr or RGB), and are thus referred to as three-dimensional look up tables.

Figure 14:
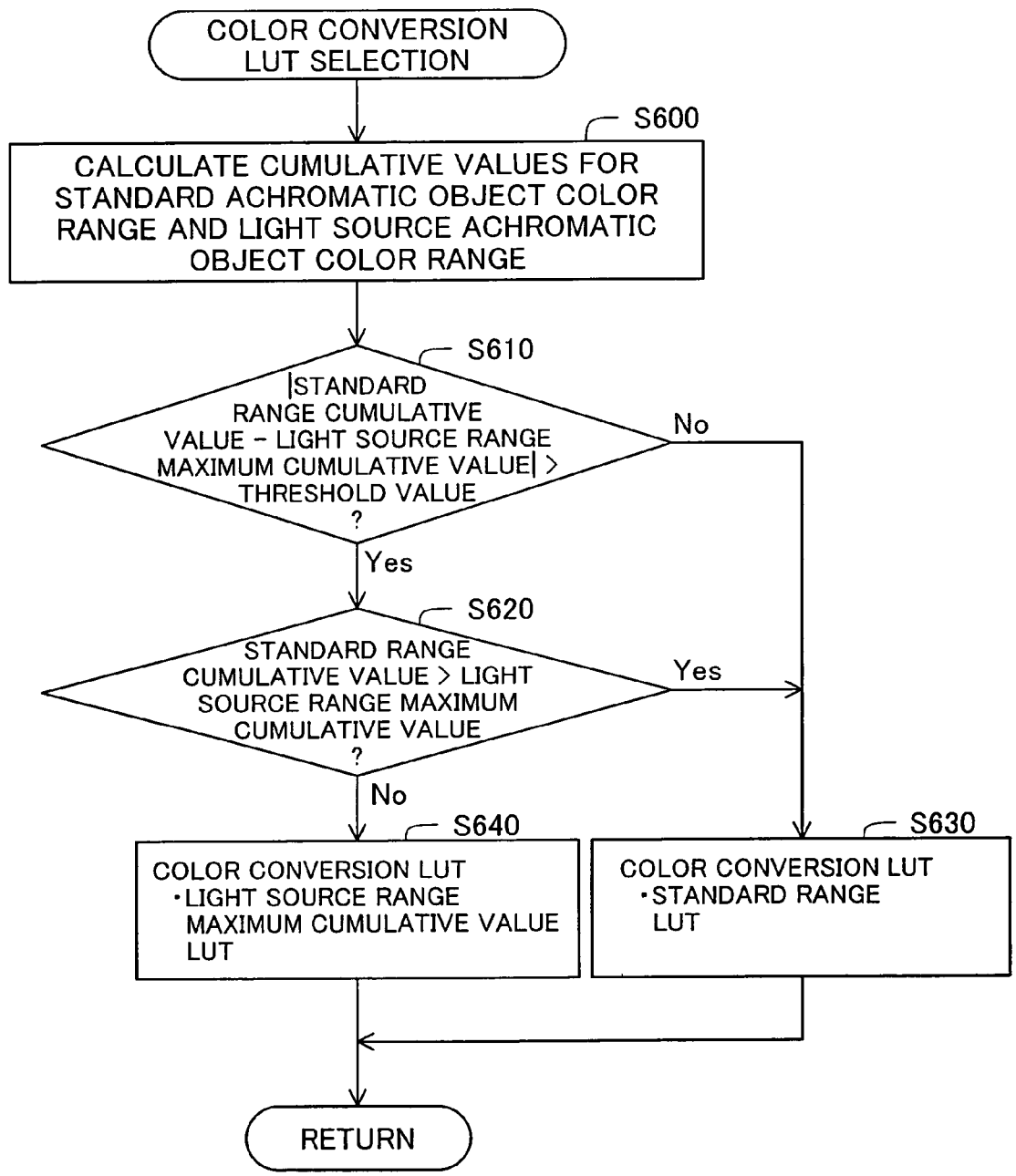
FIG. 14 is a flow chart of a procedure for the process of selecting a color conversion LUT.

FIG. 14 is a flow chart of a procedure for the process of selecting a color conversion LUT. The difference from the procedure in FIG. 11 is that a process for selecting an color conversion LUT (Steps S630, S640) is carried out instead of the process for selecting a color conversion matrix (Steps S430, S440). Steps S600 through S620 are the same as Steps S400 through S420.

When the differential condition A is not met, as in the example in FIGS. 6(e) and 6(f) (Step S610: yes), and when the standard range cumulative value is greater than the light source range maximum cumulative value, as in the example in FIGS. 6(a) and 6(b) (Step S620: yes), the achromatic object color range selecting module 220b selects the standard achromatic object color range STDR (Step S630). The color conversion LUT selecting module 222b also selects the color conversion LUT for the standard range STDR.

On the other hand, when the light source range maximum cumulative value is equal to or greater than the standard range cumulative value (Step S620: no), in the next Step S640 the achromatic object color range selecting module 220b selects the achromatic object color range having the greatest cumulative size value. The color conversion LUT selecting module 222b also selects the color conversion LUT associated with the selected light source achromatic object color range.

In the examples in FIGS. 6(c) and 6(d), for instance, the achromatic object color range selecting module 220b selects the fluorescent light range FLR, and the color conversion LUT selecting module 222b therefore selects the color conversion LUT for the fluorescent light range FLR. The color conversion LUT for the fluorescent light range FLR is set so that the saturation of the colors in the fluorescent light range FLR after the color conversion process is lower than that obtained using the standard color conversion LUT. As a result, even when the image targeted for processing has colorcast, the color conversion process allows the colors of the pixels representing the photographed subject with the original saturation to be closer to achromatic colors. This is the same for the color conversion LUT of the incandescent light range INR.

Thus, in the fourth embodiment, in the same manner as in the third embodiment, color conversion LUT established for each achromatic object color range can be used separately based on the cumulative size value of the achromatic object color ranges, allowing the color conversion process to restore nearly achromatic colors. In the fourth embodiment, the color conversion LUT also correspond to the "color conversion conditions" or "color conversion profile" in the invention.

Various processes other than those using color conversion LUTs or the aforementioned color conversion matrices can also be used as the color conversion process. For example, it is also possible to make use of color conversion processes in which functions for calculating the output pixel values from the input pixel values are used as color conversion conditions (color conversion profile). In either case, plural sets of color conversion conditions can readily be used according to the image targeted for processing when one specific set of color conversion conditions to be actually used is selected from among the plural sets of color conversion conditions according to the size index values of the achromatic object color ranges.

The color conversion conditions (color conversion profile) need not be conditions for ensuring that the colors of the associated achromatic color ranges are nearly achromatic. At least some of the plural sets of color conversion conditions are preferably those conditions in which the saturation of colors in the associated achromatic object color ranges are made smaller as a result of the color conversion process than those obtained using the standard color conversion conditions for the standard range STDR. This will allow the photographed subject to restore the original achromatic colors.

Here, the standard achromatic object color range STDR is not limited to the achromatic object color range which includes the Planckian locus (FIG. 5). Other optional achromatic object color ranges may also be used. However, the standard achromatic object color range preferably includes Planckian locus. This will reduce colorcast, which shifts achromatic colors away from the Planckian locus, by the color conversion process.

F. Fifth Embodiment

In the above fourth embodiment, the color adjusting module 214b may have a structure in which the RAW image data produced by a digital camera 100 is used as the image data targeted for processing. The pixel values of the RAW image data are sometimes composed of only one color component among the RGB color components. The missing color component(s) of each pixel can be calculated by interpolation from the surrounding pixels. Any process such as simple interpolation can be used as the interpolation process. A color conversion LUT may be used to convert the original pixel values to implement the interpolation. This will allow the color converting module 223b to carry out a color conversion process, so that processed image data in which all the pixels have the three RGB components can be produced from RAW image data.

In this case as well, color conversion LUT established for each achromatic object color range is pre-registered in the color conversion LUT selecting module 222b, and the color conversion LUT is selectively used according to the procedure for the process in FIG. 14. Here, the achromatic object color range selecting module 220b carries out the color conversion process using the standard color conversion LUT, allowing the size index values and the colors of each pixel to be obtained.

The RAW image data is also not limited to being composed of one color component out of the RGB color components. Those represented in other forms may also be used. For example, those in which the pixel values are composed of one color component from among YMCG color components may also be used. The color components of interpolated pixel values are also not limited to RGB color components. Other preset color component types (such as YCbCr color components) may also be used.

In addition, when the color adjusting module 214b uses RAW image data as the image data targeted for processing in this way, the data format converting module 212 (FIG. 1) may be omitted. Also, in the fifth embodiment, the use of LUTs is described, but color conversion matrices may be used instead. In such cases, color conversion matrices representing the interpolation may also be used.

In the above third through fifth embodiments, image data produced by a digital camera 100 (FIG. 1) is used as the input image data for the data processor 210. That is, the image data targeted for processing by the color adjusting modules 214a and 214b (FIGS. 9 and 12) are represented by the color space intrinsic to the digital camera 100. On the other hand, the color adjusting modules 214a and 214b carry out a color converting process for adjusting colors on the image data targeted for processing. That is, in the above third through fifth embodiments, the color adjusting modules 214a and 214b carry out a color conversion process for the conversion from the color space intrinsic to the digital camera 100 to a predetermined color space.

G. Sixth Embodiment

Figure 15:
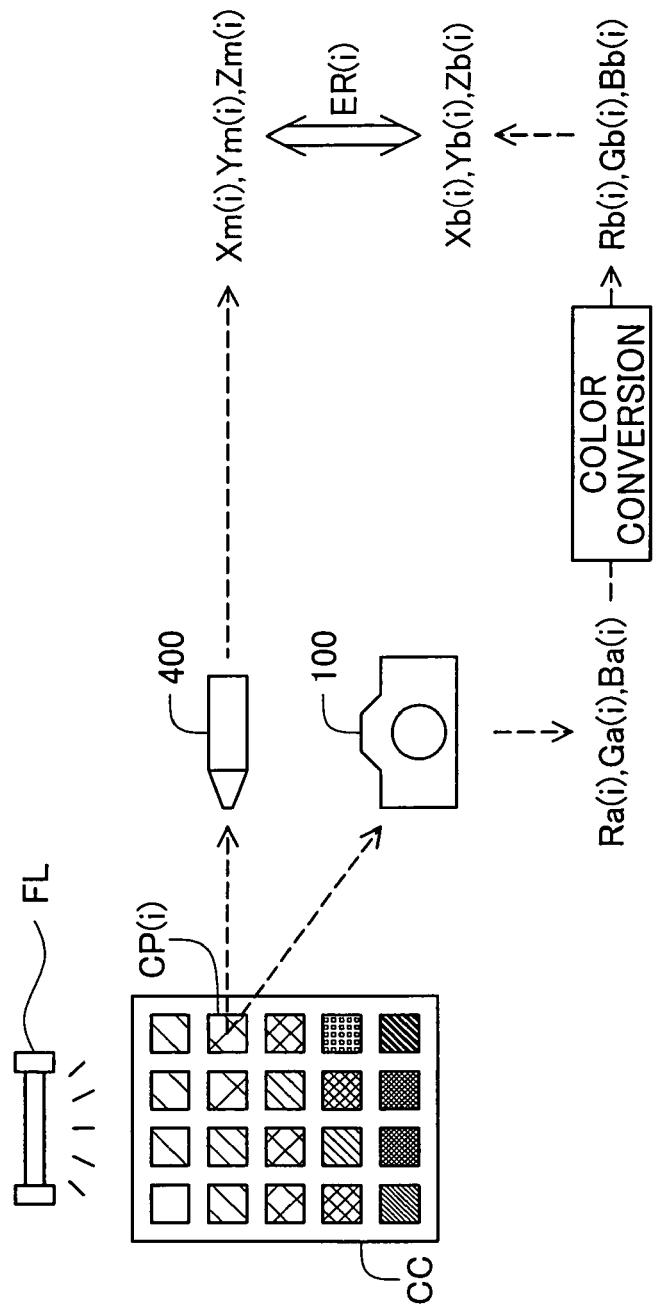
FIG. 15 illustrates the set up of a color conversion matrix.

FIG. 15 illustrates the set up of a color conversion matrix in a sixth embodiment. The difference from the third embodiment in FIGS. 9 through 11 is only that the color conversion matrix is established while taking into consideration color reproducibility. The structure and operation are otherwise the same as in the third embodiment.

FIG. 15 illustrates a color chart CC. A plurality (20 in FIG. 15) of color patches are arranged in the color chart CC. The colors of the color patches are different from each other in terms of at least one of hue saturation and lightness.

In producing color conversion matrices, the color patches are first measured with a colorimeter 400 using a light source associated with the color conversion matrix to be produced. In the sixth embodiment, in the same manner as in the third embodiment, a color conversion matrix is established for each of the achromatic object color ranges. A specific light source is associated with each of the achromatic object color ranges (FIG. 5). For example, incandescent lighting is associated with the incandescent light range INR, fluorescent lighting is associated with the fluorescent light range FLR, and sunlight (natural light) is associated with the standard achromatic object color range STDR. That is, a specific light source is associated with each color conversion matrix. When the color patches are measured to establish the color conversion matrices, the light source related to the color conversion matrix is used. FIG. 15 illustrates a case in which the color matrix for fluorescent light range FLR is to be established. Fluorescent lighting FL is used as the light source.

The calorimeter 400 measures colorimetric values representing the colors of the color patches. In this embodiment, the colorimetric values are represented by the XYZ color system. FIG. 15 shows the colorimetric values "Xm(i), Ym(i), Zm(i)" of ith color patch CP(i), where "i" is a symbol distinguishing color patches, being an integer from 1 to the total number of color patches. These calorimetric values are obtained under the light source associated with the color conversion matrix (fluorescent lighting FL in the embodiment in FIG. 15). The colorimetric values are not limited to the XYZ color system, and they may be represented by any other color system (such as the L*a*b* color system or sRGB color system).

The same color patches are then photographed. A digital camera 100 is used to take the photographs. The light source is the same one used to measure the colors. When the photographs are taken, image data representing the color patches is created. At this time, the image data is created while deliberately not correcting the colors such as by tone curve adjustment. In this embodiment, the pixel values of the image data are represented by RGB color components. FIG. 15 shows pixel values "Ra(i), Ga(i), Ba(i)" representing the ith color patch CP(i).

A color conversion process is then carried out using color conversion matrix on the pixel values representing the color patches. In this embodiment, the pixel values of the image data after the color conversion process are represented by RGB color components (in the pixel values after the color conversion process of pixels representing the color patches are referred to below as "color corrected pixel values"). FIG. 15 shows the color corrected pixel values "Rb(i), Gb(i), and Bb(i)" of the ith color patch CP(i).

The details of the color conversion process are the same as the color conversion process carried out in Step S310 in FIG. 10. However, the color conversion matrix used here is the provisional color conversion matrix. For example, the provisional matrix may be represented using variables. For example, the provisional matrix can be represented using nine variables when the color conversion matrix is a 3×3 matrix, which is used to obtain the RGB color components after the color conversion process by linear combination of the original RGB color components. The final color conversion matrix, that is, the final values of variables, may be determined by establishing certain conditions for the color corrected pixel values (details below).

A color system conversion process is then carried out to change the color system of the color corrected pixel values to that of the measured calorimetric values. For example, let us assume that the image data after the color conversion process is represented by the sRGB color system. When the colorimetric values are represented by the XYZ color system, a conversion from the sRGB color system to the XYZ color system is carried out on the color corrected pixel values. In the embodiment in FIG. 15, the color corrected pixel values "Rb(i), Bg(i), and Bb(i)" of the ith color patch (CP(i)) have been converted to the values "Xb(i), Yb(i), Zb(i)" of the XYZ color system. Alternatively, calorimetric values may be converted instead of converting the color corrected pixel values.

A color difference ER(i) between the colorimetric values of the ith color patch CP(i) and its color corrected pixel values is then calculated. In this embodiment, the color difference ER(i) is calculated according to the following Equation (5).

$$ER(i) = \{(Xm(i)-Xb(i))^2 + (Ym(i)-Yb(i))^2 + (Zm(i)-Zb(i))^2\}^{\frac{1}{2}} \quad (5)$$

In this example, the color difference ER(i) represents the magnitude of the difference between the colors represented by the calorimetric values and the colors represented by the color corrected pixel values. The color difference ER(i) is calculated for all the color patches contained in the color chart CC. The color difference ER(i) for each color patch is used to calculate the total color difference SER. The total color difference SER is calculated according to the following Equation (6).

$$SER = \Sigma ER(i) \qquad (6)$$

Here, Σ means the summation of all the color patches. The final color conversion matrix is determined so as to attain the minimum total color difference SER. Such a color conversion matrix can be determined in a number of ways. For example, the values of variables in the color conversion matrix (elements in each row and column) may be determined by the least squares method. A plurality of color conversion matrix candidates can be prepared, the total color difference SER can be calculated for each candidate color conversion matrix, and the candidate color conversion matrix resulting in the lowest total color difference SER can be used. The color conversion matrices can also be modified, and the total color difference SER can be further calculated. This series of processes can be repeated so that the color conversion matrix resulting in the minimum total color difference SER can be calculated by successive approximations.

In the above embodiment, a color conversion matrix for the fluorescent light range FLR is established, but other color conversion matrices for other achromatic object color ranges can be similarly established using other light sources. For example, incandescent lighting may be used when establishing a color conversion matrix for incandescent light range INR, and sunlight (natural light) may be used when establishing a color conversion matrix for standard achromatic object color range STDR. A plurality of color conversion matrices established in this manner are selectively used according to the same procedure as in the third embodiment (such as the same procedure for selecting a process shown in FIG. 11).

In this way, in the sixth embodiment, color conversion matrices are established so as to result in minimal color differences between the calorimetric values for the plurality of color patches and the color corrected pixel values. The color conversion process thus permits the creation of image data which reproduces the various colors of a photograph subject with colors close to the calorimetric values.

In the sixth embodiment, the color conversion process suited to the light source can be carried out because color conversion matrices have been established for respective light sources. Image generating devices such as digital cameras 100 in particular separate incident light into a plurality of color components (such as RGB color components), and measure the intensity of the light using an optical receiver (such as CCD) for each color component. As a result, the colors reproduced by the image data produced with the image generating device can be modified according to the type of light source. For example, when images are represented using an image display device such as a CRT, the images are reproduced using the light of a plurality of color components (such as RGB color component). Here, the wavelength distribution of color components of the light used to reproduce the image and the spectral properties of the color components separated by the image generating device (spectral response of receivers to equivalent energy spectrum, referred to below as "photoreception spectral properties") are often not strictly consistent with each other. As a result, when the images are reproduced without modifying the grayscale levels obtained from the photo receiver, it is possible that the color will not be able to be properly reproduced due to the light source used during photography. Here, if color conversion matrices are established for respective light sources and used selectively, it will be possible to reproduce the proper colors according to the various light sources. This is not limited to the display of images, but is also applicable to the printing of images.

Here, the color conversion matrices for respective light source are preferably established in such a way that the color difference ER obtained using the color conversion matrix adapted to the type of light source is lower than the color difference ER obtained using color conversion matrices for other light sources. For example, let us consider a case in which a color conversion matrix for fluorescent lighting and a color conversion matrix for incandescent lighting can be used. When fluorescent lighting is used as the light source, the color difference ER calculated using a color conversion matrix for fluorescent lighting is lower than the color difference ER calculated using a color conversion matrix for incandescent lighting. Conversely, when incandescent lighting is used as the light source, the color difference ER calculated using a color conversion matrix for incandescent lighting is lower than the color difference ER calculated using a color conversion matrix for fluorescent lighting. The same is true for cases in which color conversion matrices for other light sources are used.

The condition that "the color difference ER obtained using a color conversion matrix adapted to the type of light source is lower than the color difference ER obtained using color conversion matrices for other light sources" (referred to below as the "light source color difference condition") need not necessarily be met for the color patches of any colors. However, it is preferable that the range of colors meeting the light source color difference condition (the range of hue, saturation and lightness) is substantially broad. Here, methods of evaluation using standard color charts can be used to evaluate the color conversion matrices. Examples of standard color charts include the Munsell Book of Color, Matte Collection and the Munsell Book of Color, Glossy Edition (both trademarks of the Gretag MacBeth company) or the JIS Standard Color Chart, Glossy Edition. The total of the color difference ER for all the colors contained in the color chart (referred to below as "total color chart difference") is preferably lower than the total color chart difference calculated using color conversion matrices for other light sources. For example, when fluorescent lighting is used as the light source, the total color chart difference calculated using a color conversion matrix for fluorescent lighting is lower than the total color chart difference calculated using a color conversion matrix for incandescent lighting.

The number of color patches used to establish the color conversion matrices is not limited to 20. A greater or lower number may be used.

The color difference ER is not limited to the value obtained using the above Equation (5). Any value representing the magnitude of differences between colors can be used. For example, the total of absolute values of the differences for the color components may be used as the color difference. The color components used to calculate the color difference are not limited to the color components of the XYZ color system. The color components of any color system can be used. For example, the color difference may be calculated using the L*a*b* color components of the L*a*b* color system, or the RGB color components of the sRGB color system may be used to calculate color differences.

In the embodiment in FIG. 15, RGB color components are used as the color components of the image data which is targeted for the color conversion process, but other color components may also be used. RGB color components are used as the color components of the image data which undergoes the color conversion process, but other color components may also be used. The color components before and after the color conversion process may also be different. In either case, a color system for handling the image data which has undergone the color conversion process is predetermined, and the color difference ER between the color corrected pixel values and the colorimetric values is calculated based on that color system and the color system representing the colorimetric values. This will ensure that the color conversion matrix is capable of proper color reproduction.

The use of color conversion matrices is described in the sixth embodiment, but color conversion lookup tables can be established in the same manner as color conversion matrices when such color conversion lookup tables are employed. In such cases, the color conversion lookup tables for respective light sources are established while taking into consideration the color reproducibility. In these cases, too, the condition that "the color difference ER obtained using a color conversion look up table adapted to the type of light source is lower than the color differences ER obtained using color conversion look up tables for other light sources" (light source color difference condition) is also be met for a broader range of colors. It is possible to carry out a color conversion process which properly reproduces a variety of colors when the total color chart color difference calculated using color conversion lookup tables suited to a variety of light sources is lower than the total color chart color differences calculated using color conversion lookup tables for other light sources.

Color conversion conditions (color conversion profile) for each light source can also be established while taking into consideration color reproducibility in cases where other types of color conversion conditions such as mathematical functions are used, not just color conversion matrices or color conversion lookup tables.

In some cases a plurality of models will be used as the image producing device such as digital cameras 100. In such cases, color conversion conditions established using one model may be used in common by a plurality of models. However, the photoreceptor spectral properties (spectral properties of each color component) sometimes vary according to the model of the image producing device. It is thus desirable to establish color conversion conditions for light sources for each type of image producing device.

Any type of color conversion condition established for each light source can be used, not just those established in consideration of color reproducibility.

H. Outline of Image Reproducing Method in Seventh Embodiment

Figure 16:
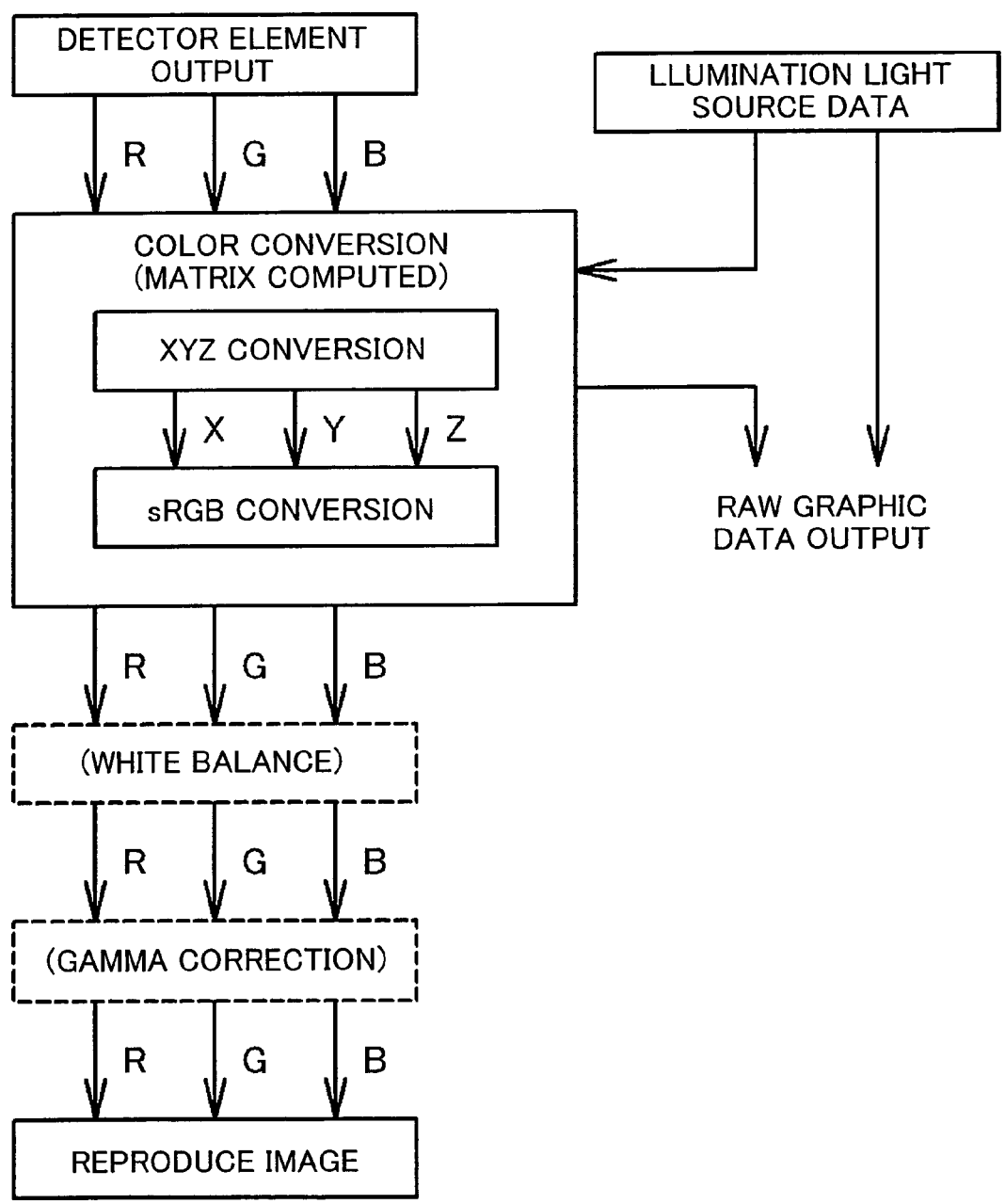
FIG. 16 is a block diagram of the general course from the creation of the image data of the photographed image to the reproduction of the image.

The general course of processing of the seventh embodiment up to the reproduction of the image after being photographed will be described briefly before a more detailed description of the embodiment. FIG. 16 is a block diagram of the general course from the creation of the image data of the photographed image to the reproduction of the image. The image data is produced by focusing the image of the photographed subject on detector elements to obtain two dimensional light intensity distribution signals. Individual imaging elements such as CCD or CMOS are widely used as such detector elements. In these detector elements, the light intensity is usually detected over the three wavelength regions for R, G, and B, to produce R, G, and B image data.

A color conversion process is then performed on the resulting image data. The color conversion process on the image data is performed for the following reasons. The R, G, and B wavelength regions used to produce the R, G, and B image data are usually not strictly consistent with the R, G, and B wavelength regions used to reproduce or output the image. Thus, simply reproducing or outputting the image data that has been obtained will result in colors that are different from the colors of the original image. When the RGB image data is received, color conversion is first appropriately performed as befits the color space used during the reproduction.

In the image reproducing method in this embodiment, the color conversion that is performed is suited to the illumination light source used to focus the image of the photographed subject on the detector elements. In the embodiment illustrated in FIG. 16, the image data of the RGB color space obtained from the detector elements has undergone, via XYZ color space, coordinate conversion to the image data of color space for reproducing the image (sRGB color space in FIG. 16). Because the color conversion is thus done in two stages for the image data obtained by the detector elements, the color conversion for the illumination light source can be done in either stage. For example, color conversion suitable for the illumination light source may be done at the stage where the RGB color space obtained by the detector elements undergoes coordinate conversion to XYZ color space, or color conversion suitable for the illumination light source may be done at the stage where the image data of the XYZ color space is converted to sRGB color space. Color conversion suited to the illumination light source may be done at any stage when there are more than two stages.

The RGB image data which has thus undergone the proper color conversion suited for the illumination light source then undergoes white balancing and/or gamma correction as needed, and the resulting RGB image data is then used to reproduce the image. Because the color conversion can be done properly according to the illumination light source when the image is reproduced in this way, the colors can be accurately reproduced with image data taken under any illumination light source.

In some cases, RAW image data including the RGB components and additional data related to the illumination light source may be output, and when this image data is to be reproduced, it is preferable that the color conversion is performed according to the illumination light source. RAW data may include sRGB color space image data or XYZ color space image data which are converted from the detected values without taking into consideration the illumination light source, in place of the original R, G, B image data directly obtained from the detector elements.

Reproducing the image data in this manner will allow the original colors of images taken under different light sources to be reproduced with high accuracy. The technique for reproducing images in this manner is described in detail in the following embodiments.

The seventh embodiment in which the image data is output with the colors converted according to the illumination light source will be described first.

H1. Structure of Equipment in Seventh Embodiment

Figure 17:
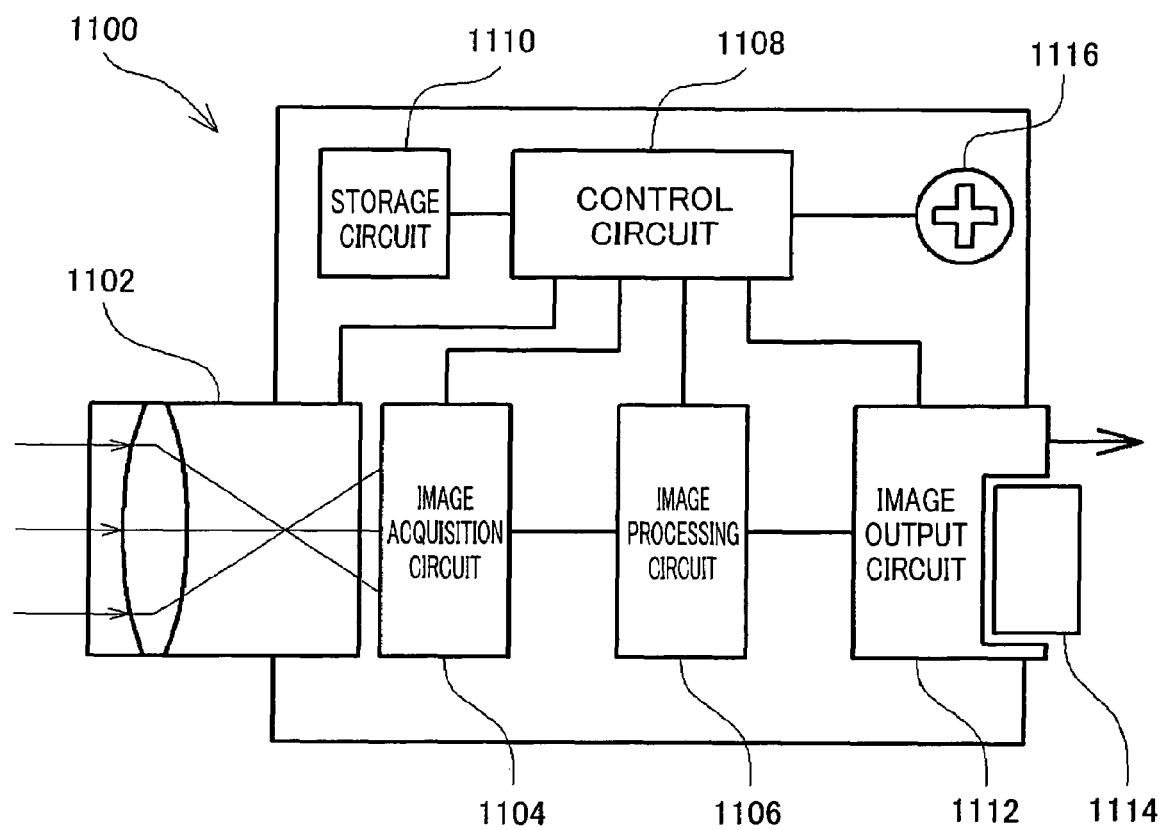
FIG. 17 illustrates the structure of a image data output device in a seventh embodiment.

FIG. 17 illustrates the structure of a image data output device in the seventh embodiment, using the example of a digital camera. The image data output device in the seventh embodiment can also be constructed as other types of devices such as digital video cameras and color scanners.

The digital camera 1100 comprises an optical system 1102 composed primarily of a lens and a lens driving mechanism, an image acquisition circuit 1104 primarily composed of a CCD (charge coupled device), an image processing circuit 1106 composed primarily of a DSP (digital signal processor), a control circuit 1108 composed primarily of a CPU, a memory circuit composed primarily of ROM, RAM, an image output circuit 1112 composed primarily of a dedicated LSI, and a cross-shaped cursor 1116 for various settings in the control circuit 1108.

When images are taken with such a digital camera 1100, the image is focused by the optical system 1102 onto the CCD of the image acquisition circuit 1104. Minute detector elements for converting light to an electrical charge are embedded in one side of the CCD photoreceptor surface. When the image is focused, the detector elements generate an electrical charge according to the light intensity at their various locations. The image acquisition circuit 1104 detects the level of the electrical charge produced by the CCD detection elements to acquire the light intensity data at each pixel location producing the focused image. The image processing circuit 1106 runs a certain image process on the light intensity data obtained by the image acquisition circuit 1104 and produces image data. The image output circuit 1112 outputs the resulting image data through a cable to the outside. Alternatively, the data is written to a memory element 1114 such as a memory card, and can be output through the memory element 1114. The operation of the optical system 1102, image acquisition circuit 1104, image processing circuit 1106, and image output circuit 1112 are controlled by the control circuit 1108. Various programs and types of data required for that control are pre-stored in the ROM of the storage circuit 1110, and the control circuit 1108 reads those programs or types of data to control the other parts.

Color image data which has undergone the appropriate color conversion according to the illumination light source, which is used to focus the image on the CCD, is output by the image data output device in the seventh embodiment. The process for generating and outputting such color image data is described below.

H2. Image Data Output Process in Seventh Embodiment

Figure 18:
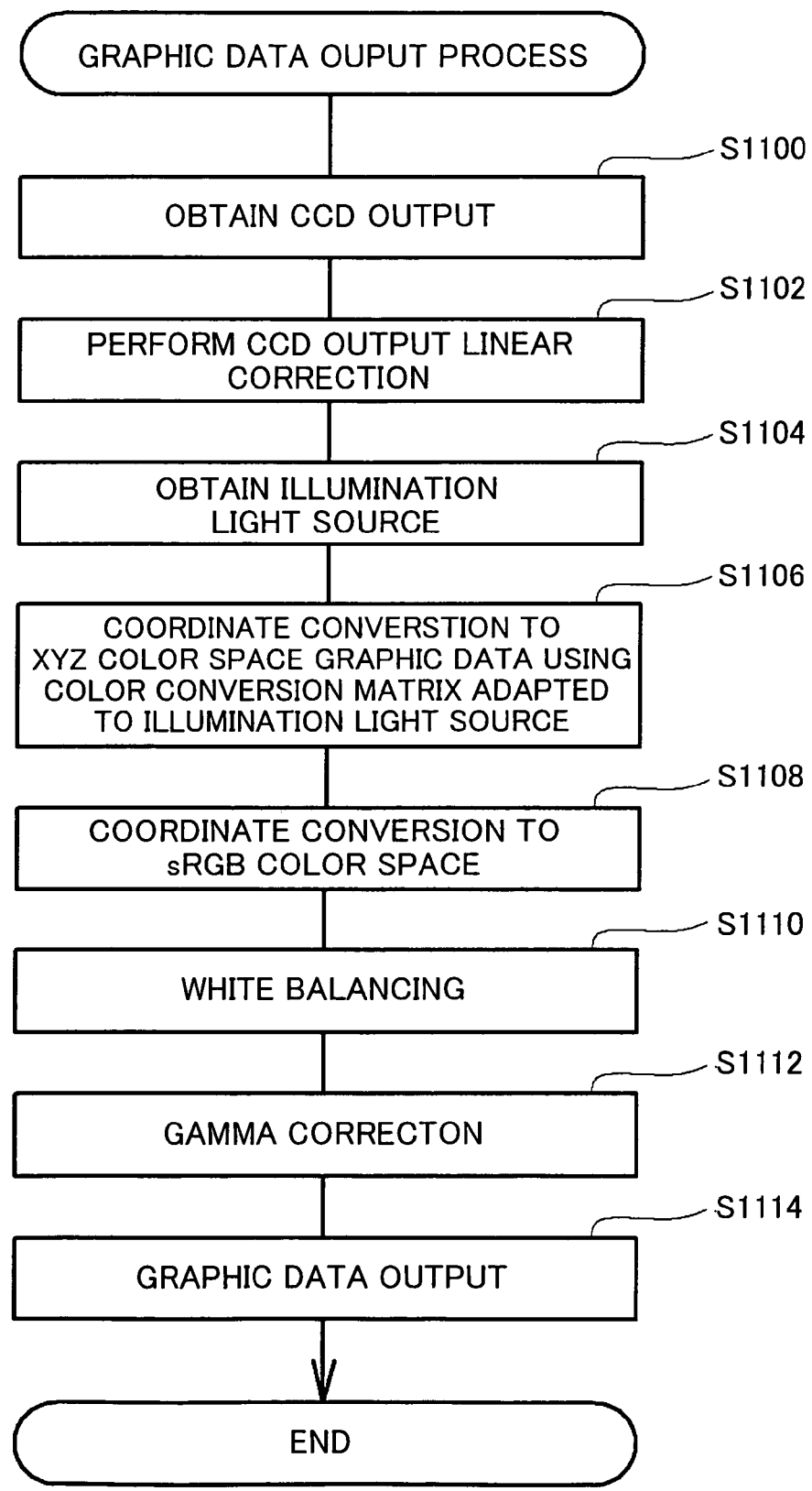
FIG. 18 is a flow chart of the course in a process for the creation and output of color image data in the image data output device in the seventh embodiment.

FIG. 18 is a flow chart of the course in the process for the creation and output of color image data in the image data output device in the seventh embodiment. When the process is begun, the image of the photographed subject is first focused on the CCD of the image acquisition circuit 1104 to obtain the CCD output of the R, G, B color components (Step S1100). The digital camera 1100 in this embodiment has only one CCD. Through a process referred to as color interpolation, the CCD output of the RGB color components is produced from the one CCD output. Although in this case the light intensity is converted to electrical signals using the CCD, the device for detecting the light intensity is not limited to CCDs. Other devices such as CMOS sensors can also be used.

Figures 19A, 19B:
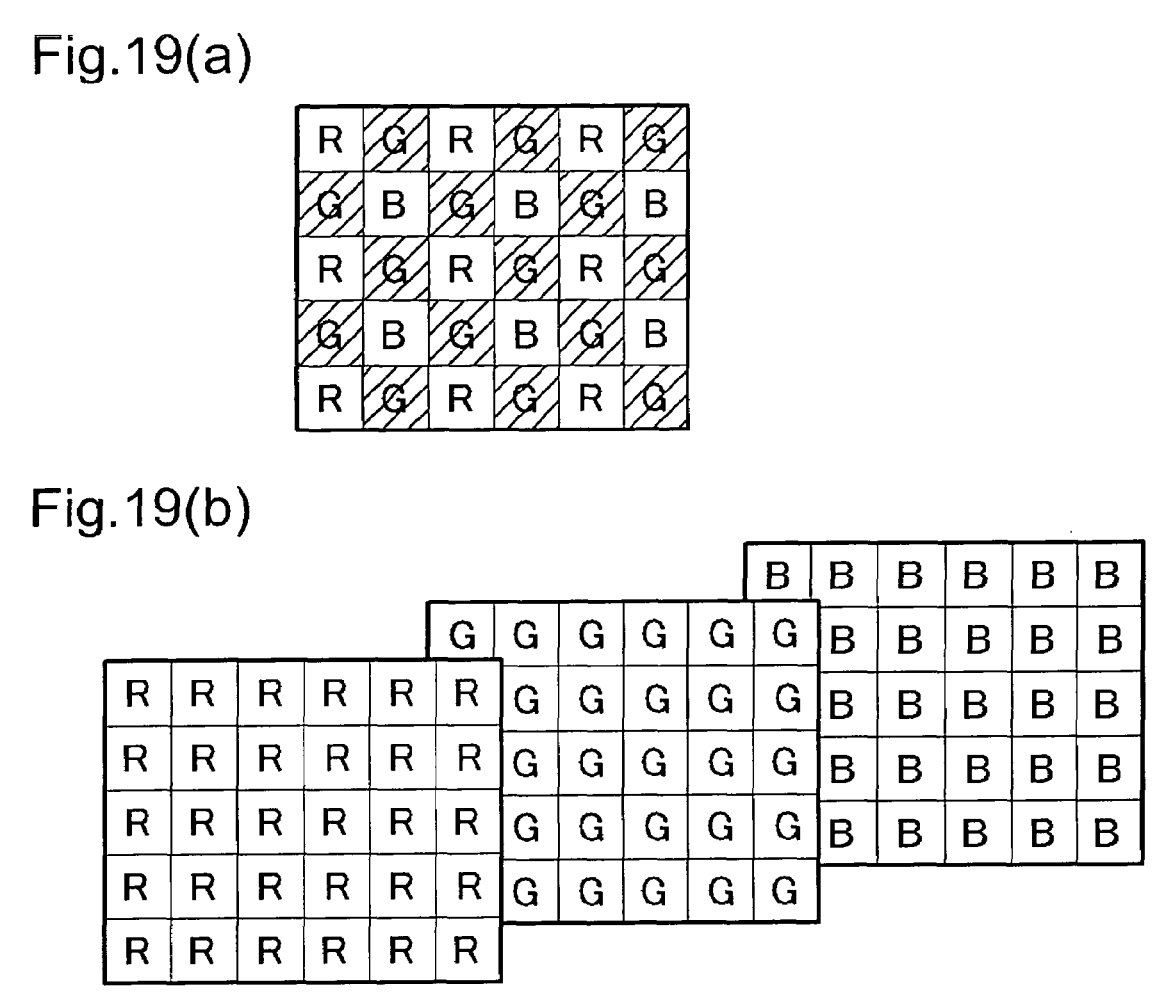

FIGS. 19(*a*)-19(*b*) schematically illustrate the creation of CCD output of RGB colors from a single CCD output by color interpolation in the digital camera 1100 of this embodiment. A color filter combining small filters allowing only R colored light to pass through (R filter), small filters allowing only G colored light to pass through (G filter), and small filters allowing only B colored light to pass through (B filter) is first provided in front of the CCD. This will allow the light intensity of R colored light to be detected by the detector elements after the R filters, the light intensity of G colored light to be detected by the detector elements after the G filters, and the light intensity of B colored light to be detected by the detector elements after the B filters.

FIG. 19(*a*) schematically illustrates the detection of R, G, B colored light by each of the detector elements on the CCD. The small squares in the figure schematically represent the minute detector elements on the CCD. In actuality, more detector elements are mounted on the CCD, but for the sake of simplicity 30 elements (5×6) are portrayed here. In the figure, detector elements represented by an "R" indicate elements that detect the light intensity of R colored light, detector elements represented by a "G" indicate elements that detect the light intensity of G colored light, and detector elements represented by a "B" indicate elements that detect the light intensity of B colored light. An interpolation process for each color component is thus carried out based on the data of the R, G, B light intensities obtained in mosaic form, so that R, G, B color image data such as that illustrated in FIG. 19(*b*) is produced. A process for acquiring the RGB color image data from the CCD output is thus performed in Step S1100 in FIG. 18.

In this embodiment, the RGB color image data is obtained from a single CCD by using color filters combining RGB color filters in mosaic form, but the RGB color image data can also be obtained by using a color separator for separation into the light of the RGB colors and then focusing images of three colors on the three CCD panels, respectively.

When the RGB color image data has thus been obtained, linear correction is then performed on the RGB color image data (Step S1102). This is done for the following reasons. As noted above, the detector elements on the CCD generate an electric charge according to the light intensity, but due to the variation between elements or to effects such as the principles involved in the generation of charges, the charge level (that is, the CCD output) is not always proportional to the received light intensity. The CCD output is thus corrected and thus converted to output that is properly proportional to the light intensity.

Figure 20:
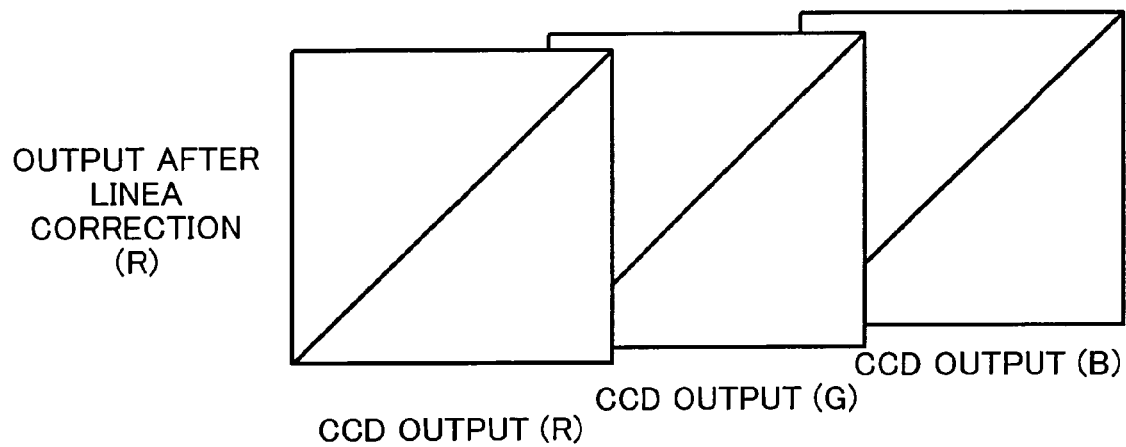
FIG. 20 schematically illustrates a one-dimensional table used as reference during linear correction.

Linear correction of the CCD output can be done by referencing a one-dimensional table. FIG. 20 schematically illustrates a one-dimensional table used as reference during linear correction. A one-dimensional table matching linear corrected output to CCD output, such as that shown in FIG. 20, is pre-stored for each R, G, B color in the storage circuit 1110 of the digital camera 1100 in FIG. 17. In Step S1102 in FIG. 18, such a one-dimensional table is referenced to carry out a process in which the image data obtained for the RGB colors based on the CCD output is converted to data that is properly proportional to the light intensity. As may be seen from the one-dimensional table in FIG. 20, the CCD output usually results in a value that is generally proportional to the light intensity, with no major differences between the output values before and after linear correction. The linear correction process can thus be omitted in some cases.

After the linear correction of the image data, the light source used for illumination in the photographed subject is identified (such as incandescent lighting, fluorescent lighting, or sunlight) (Step S1104). Here, plural names of light sources are pre-stored in the digital camera 1100 storage circuit 1110, the operator of the digital camera 1100 selects the name or type of the illumination light source using the cursor 1116 before taking a photograph, and the light source is set by the control circuit 1108. Of course, this is not the only method that can be used. The name or type of the illumination light source can also be inferred from the light intensity distribution of the RGB color light retrieved by the CCD. For example, because images taken using incandescent light will result in images that are reddish overall, the illumination light source can be identified to be incandescent light when the R color is stronger than the other colors. Because the intensity of RGB colors is often characteristically proportional according to the type of the illumination light source, the type of the illumination light source can be identified by determining the color intensity distribution.

When the illumination light source has been identified, the linear corrected RGB image data undergoes a color conversion process using a color conversion matrix corresponding to the illumination light source (Step S1106). In this embodiment, the RGB image data obtained from the CCD output undergoes color conversion to XYZ color space image data. A brief description of an outline of the color conversion process will be given first in order to set up a detailed description of the process.

The R, G, B color light is separated using the color filters, giving the light intensity r, g, and b of each color. In this case, the R, G, and B colored light can be mixed at the r, g, and b intensities to reproduce colors that are the same as in the original image, as determined by the Glassman method of measurement. However, the central wavelength of the R, G, B colored light separated by the color filters is usually different from the wavelength of the R, G, and B colored light used to reproduce or output images. The colors represented in images reproduced with the use of unmodified R, G, B colored gray scale data detected by the CCD detector elements are thus different from the original colors.

Color conversion matrices suitable for the type of illumination light sources (incandescent lighting or fluorescent lighting) are pre-established in the storage circuit 1110 of the digital camera 1100 in the embodiment illustrated in FIG. 17. In Step S1106 in the image data output process illustrated in FIG. 18, a color conversion matrix associated with the type of the illumination light source previously obtained in Step S1104 is read from the storage circuit 1110, and the color conversion matrix is used on the linear corrected RGB image data to convert coordinates for the XYZ color space image data according to the illumination light source.

The resulting XYZ color space image data then undergoes color conversion again for coordinate conversion to sRGB color space image data (Step S1108). The conversion of coordinates from XYZ color space to sRGB color space can be done using the color conversion matrix in FIG. 21. Coordinate conversion of the image data to sRGB color space data permits the display of images with natural gray scale characteristics on most image reproducing devices such as monitors.

In the image data output process in this embodiment, coordinates of the image data are converted to sRGB color space, which is the most standard color space, in order to properly reproduce images on as many devices as possible without specifying the device for reproducing images. Of course, when the device for reproducing images is specified, coordinates of the image data can be converted to the specific color space used by the image reproducing device instead of sRGB color space.

The RGB output of the CCD does not undergo coordinate conversion immediately to sRGB color space data, but first undergoes color conversion to XYZ color space image data for the following reasons. A method for determining the color conversion matrix corresponding to the illumination light source is described below, but the color conversion matrices are different for each color space after conversion. For example, let us imagine image data taken under a certain illumination light source. When the image data undergoes coordinate conversion into two color spaces; the color conversion matrices for the illumination light source will end up being different if the color spaces after conversion are different. Because the color conversion matrices for the color spaces after conversion are also different, it is preferable that the color space after conversion is as standard as possible. In this respect, the sRGB color space and XYZ color space both act as the standard color space.

Figure 32:
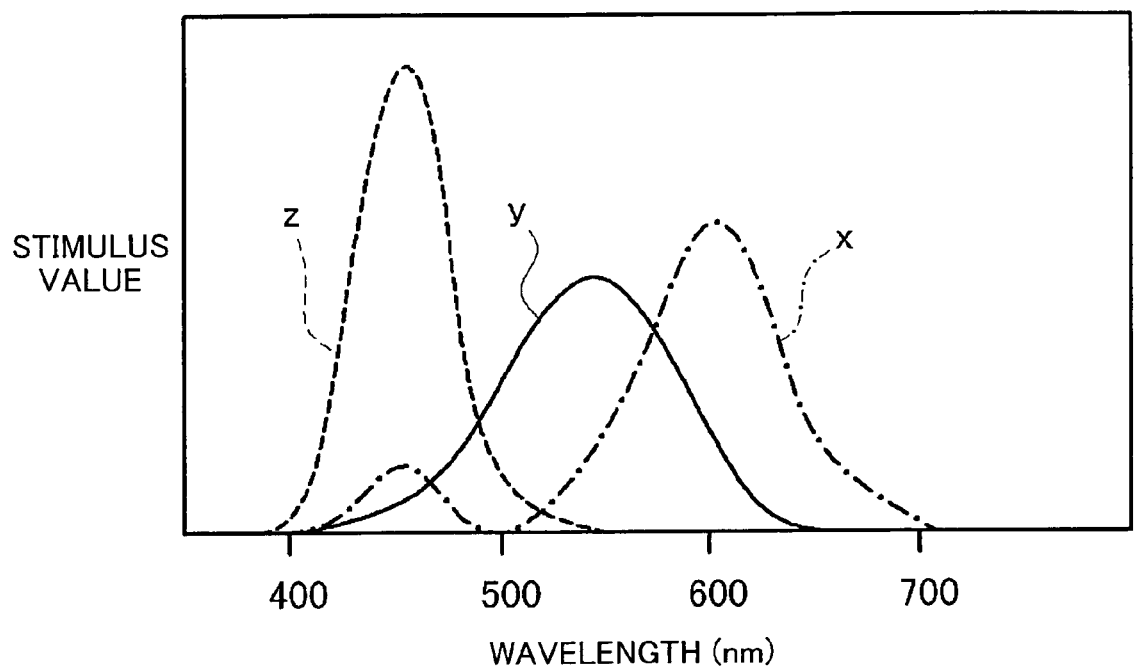
FIG. 32 illustrates the color-matching functions.
Figure 33:
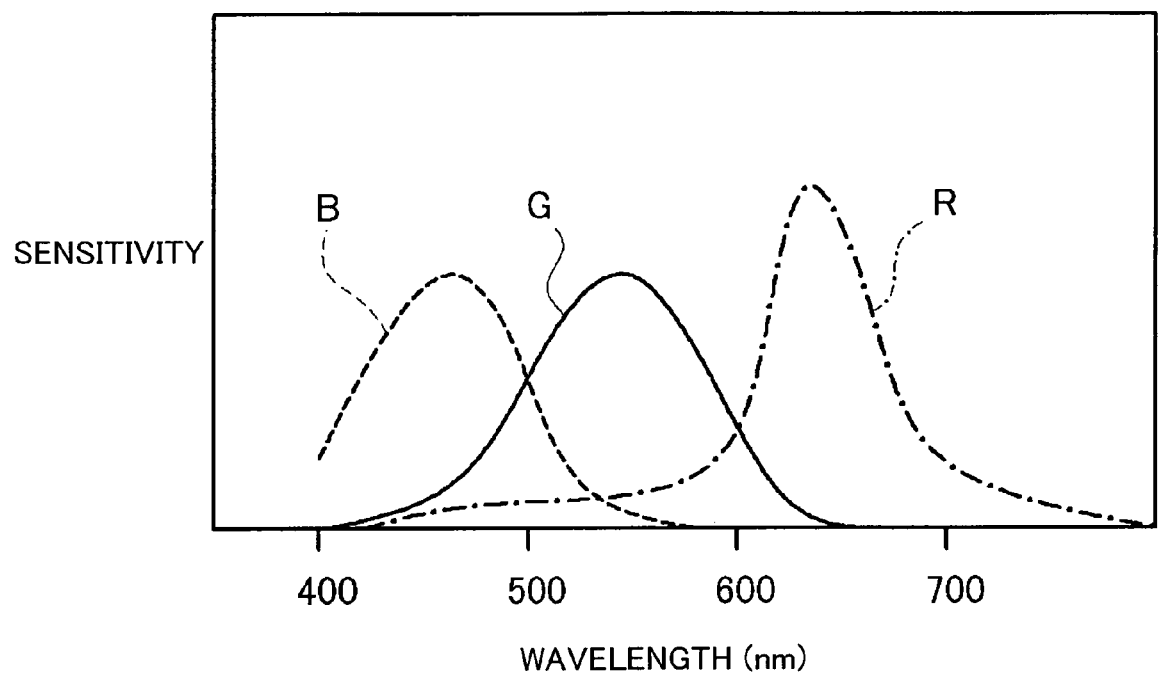
FIG. 33 schematically illustrates the standard spectral sensitivity characteristics of photographing devices such as digital still cameras.

However, as noted earlier using FIG. 32 as reference, XYZ color space affords a broader range of colors which can be expressed than sRGB color space, and can also represent gray scale more accurately. Coordinate conversion to XYZ color space rather than to sRGB colors space can thus avoid the danger of resulting in a narrow range of colors during color conversion and in poor gray scale resolution. In other words, when sRGB colors paces is used as the color space after coordinate conversion during the establishment of the color conversion matrices according to illumination light sources, simply converting the colors according to the illumination light source may result in a narrow range of colors which can be represented or in poor gray scale resolution of the image data. By contrast, establishing color conversion matrices according to the illumination light sources using XYZ color space as the color space after coordinate conversion will not result in such problems simply by converting colors according to the illumination light source. Thus, after the appropriate color conversion according to illumination light source, the image data after the color conversion can undergo further coordinate conversion as needed to reproduce high quality images. In the image data output process in the seventh embodiment illustrated in FIG. 18, it is for these reasons that the RGB image data is first converted to XYZ color space and then converted to sRGB color space image data.

A process for adjusting the white balance is then performed on the resulting sRGB color space image data (Step S1110 in FIG. 18). This is the following process. Human perception is equipped with the function of color adaptation, allowing white to be recognized as white under any light source. For example, although white might be expected to look yellowish under yellowish light sources and reddish under reddish light sources, in both cases humans perceive the whites as white. When images are taken with a CCD, however, white is photographed with a yellowish cast under a yellowish light source and with a reddish cast under a reddish light source. Thus, when the image is subsequently reproduced, the difference from the remembered color can cause dissatisfaction. To avoid this, a process is carried out to adjust the gain of the R, G, and B colors according to the light source, so that whites are photographed as white.

In the image data output process in this embodiment, color conversion is carried out according to the illumination light source in Step S1106. The color conversion process and the aforementioned white balancing are similar in that the adjustments are made taking differences in illumination light source into account. However, the effects of the targeted illumination light source differ as follows between the color conversion process and the white balancing process. That is, the effect of the illumination light source taken into consideration during color conversion is the effect of the optical spectrum of the light source to the RGB output of the CCD and to human perception. In other words, a color conversion matrix suited to the illumination light source is used to carry out the color conversion process while correcting differences in the spectral sensitivity characteristics between the CCD and human perception.

The effect of the illumination light source taken into consideration during white balancing is the effect on the function of color adaptation in human perception. In other words, since the CCD has no color adaptation function, the image data is white balanced to approximate such a color adaptation function. Since the white balance process and the color conversion process which are carried out according to the illumination light source are intended to correct different effects, the white balancing is done in addition to the color conversion in the image data output process in FIG. 18.

The white balancing is followed by gamma correction (Step S1112). Gamma correction is the following process. In the average monitor, the relationship between input and output is not linear. This is because in monitors the relationship between applied voltage E and image luminance I is generally $I=k \times E^\gamma$. The screen is not very bright when the voltage E is low, but brightens precipitously when the applied voltage increases to a certain extent. Here, k is the proportional constant, and γ (gamma) indicates the extent to which the applied voltage E and the screen luminance I are not linear. When γ=1, the luminance I is proportional to the voltage E. The luminance I increases in linear fashion as the applied voltage E increases, but the farther the value for γ is from 1, the greater the nonlinearity of the relationship between the two.

Figure 22:
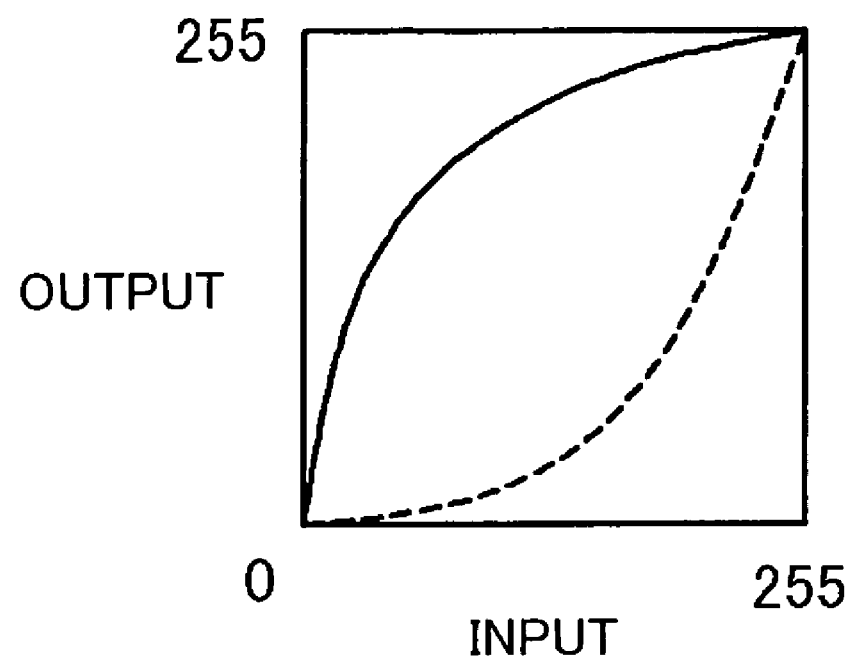
FIG. 22 illustrates the details of gamma correction.

FIG. 22 illustrates the details of gamma correction carried out in the image data output process in this embodiment. The graph indicated by the dashed line in the figure shows the properties of ordinary monitors. The γ value is usually greater than 1. In monitors with such properties, the gray scale level of the input data increases at a constant proportion, yet the monitor brightness cannot increase at a constant proportion. Thus, as illustrated by the solid line in FIG. 22, the gray scale is modified to enhance the input values in the low grayscale region. Specifically, the gray scale is modified so that the γ value is the inverse of the monitor γ value, allowing the brightness of the monitor to be changes according to the gray scale level of the input data. In Step S1112 in FIG. 18, a process is carried out to modify the RGB color image data according to the properties indicated by the solid line in FIG. 22.

When the gamma correction is carried out as described above, the RGB color image data that is ultimately obtained is output to an image reproducing device such as a monitor, concluding the image data output process illustrated in FIG. 18 (Step S1114). The RGB image data output in this manner undergoes appropriate color conversion using a color conversion matrix suited to the illumination light source. Images can thus be properly reproduced in the same way as ordinary image data, no matter what kind of illumination light source is used to produce the image data.

H3. Method for Producing Color Conversion Matrices in Seventh Embodiment

As noted above, in the image data output process in this embodiment, color conversion matrices suited to the illumination light source are used for color conversion to permit images to be properly reproduced regardless of the illumination light source under which the image was produced. A method for producing color conversion matrices for the proper color conversion of image data according to the illumination light source will be described.

Figure 23:
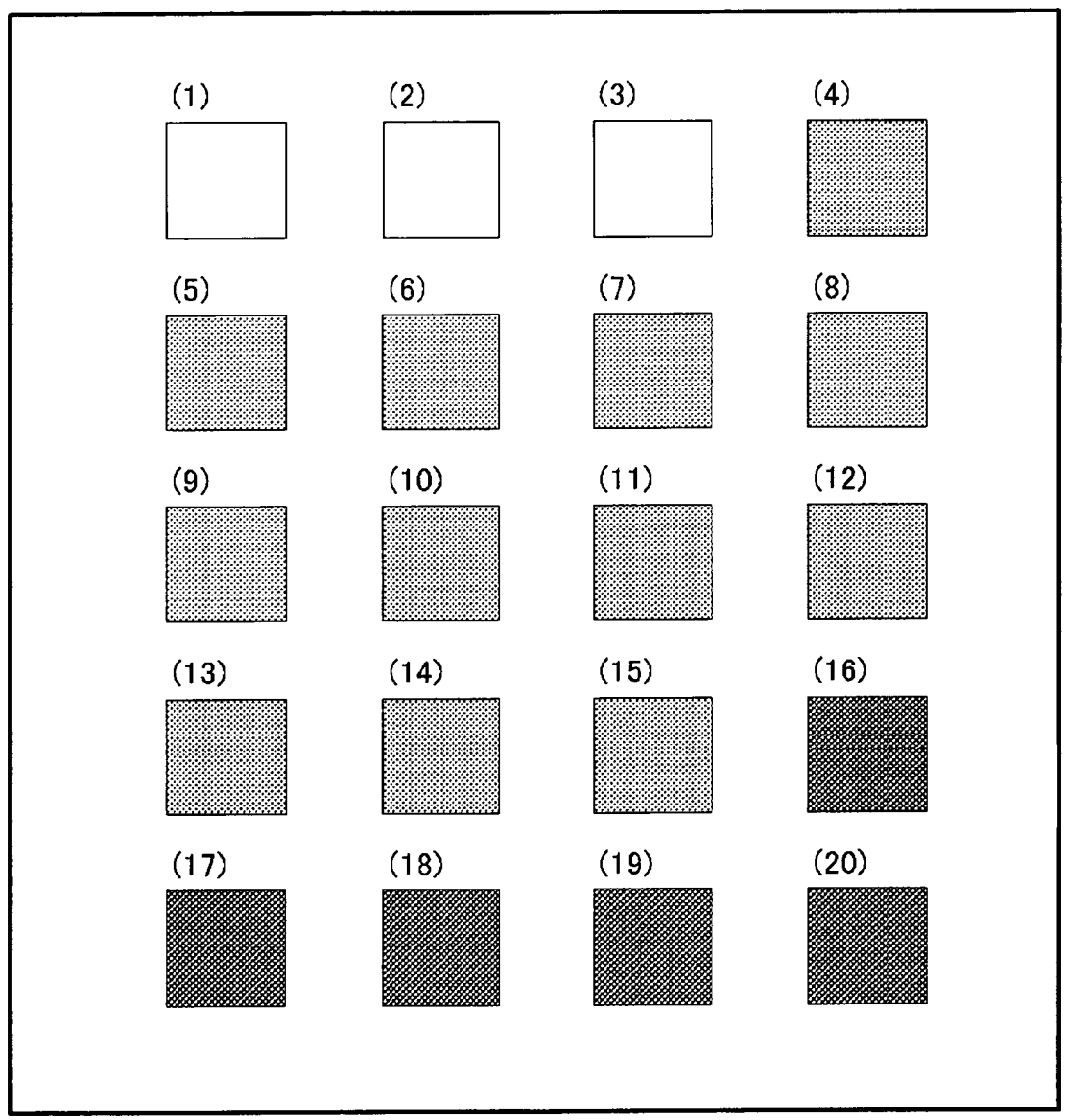
FIG. 23 illustrates an embodiment of a color chart used to set color conversion matrices according to illumination light sources.

FIG. 23 illustrates an embodiment of a color chart used to set color conversion matrices according to illumination light sources. As illustrated, the color chart is composed of a plurality of areas which are coated with different colors. In the color chart shown in FIG. 23, there are twenty areas 1 through 20. The color conversion matrix for an illumination light source is established using the calorimetric values of the color patches contained in the color chart.

FIGS. 24(a)-24(d) illustrate a method for setting color conversion matrices according to illumination light sources. For example, when a color conversion matrix is established for incandescent light, the color patches 1 through 20 are measured while the color chart in FIG. 23 is illuminated with incandescent light. As a result, colorimetric values X, Y, and Z can be obtained for each color patch 1 through 20. X(1), Y(1), and Z(1) represent the X, Y, and Z values obtained by measuring the first color patch. Similarly, X(2), Y(2), and Z(2) represent the X, Y, and Z values obtained by measuring the second color patch.

RGB image data is obtained by using a digital camera 1100 to photograph the color patches 1 through 20 under the same conditions. The aforementioned color conversion, white balancing, and gamma correction, etc. are not carried out at that time. RGB color image data can be obtained with just linear correction of the CCD output on the color patches 1 through 20 in this way. Here, R(1), G(1), and B(1) represent the gray scale levels of the R, G, and B image data of the first color patch. Similarly, R(2), G(2), and B(2) represent the gray scale levels of the R, G, and B image data of the second color patch.

The above operations establish the corresponding relations between the calorimetric values X, Y, and Z under incandescent lighting and the R, G, and B gray scale levels before color conversion for each color patch. For example, colorimetric values X(1), Y(1), and Z(1) and the corresponding CCD output R(1), G(1), and B(1) can thus be obtained for the first color patch. Similarly, the colorimetric values X(2), Y(2), and Z(2) and the corresponding CCD output R(2), G(2), and B(2) can be obtained for the second color patch.

The color conversion matrix for the proper conversion of the RGB output of the CCD obtained under incandescent lighting is a matrix that converts the CCD output R(1), G(1), and B(1) of the first color patch to the actual colorimetric values X(1), Y(1), and Z(1). Similarly, the CCD output R(2), G(2), and B(2) of the second color patch is to be converted to the actual colorimetric values X(2), Y(2), and Z(2). That is, a matrix that converts the RGB output of the CCD for the color patches to the actual colorimetric values XYZ can be considered a matrix that properly converts the colors of image data produced under incandescent lighting. The color conversion matrix is determined so that the RGB output of each color patch is converted as closest as possible to the colorimetric values XYZ.

Figures 24A, 24B, 24C, 24D:
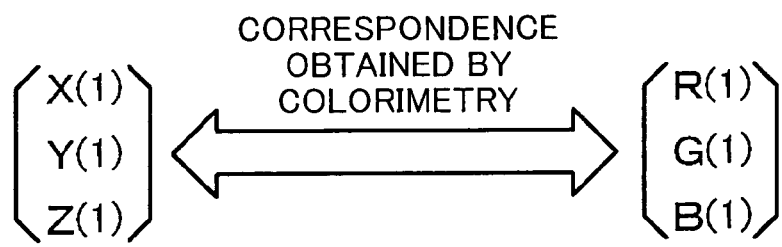
FIGS. 24(a)-24(d) illustrate a method for setting color conversion matrices according to illumination light sources.

To determine such matrices, a matrix such as the one illustrated in FIG. 24(b) is first presupposed. The calculated values obtained by using the matrix on the CCD output R(1), G(1), and B(1) of the first color patch will be X'(1), Y'(1), and Z'(1). As noted above, because the actual colorimetric values are X(1), Y(1), and Z(1), error ER(1) as illustrated in FIG. 24(c) may be produced for the first color patch.

Similar operations for the 2nd through 20th color patches can produce errors ER(2) through ER(20). The total color patch error ER is determined, and the nine elements a11, a12, a13, a21, a22, a23, a31, a32, and a33 included in the matrix are determined so as to result in the minimum error value. Because there are 20 color patches, the least squares method can be applied to determine the nine elements resulting in the minimum total error ER. Thus determining the nine elements in the matrix will result in a color conversion matrix capable of converting the CCD output obtained under incandescent lighting to the proper XYZ values.

In the above description, incandescent lighting is used as an example of the illumination light source, but color conversion matrices can be determined in exactly the same manner for other illumination light sources. FIG. 25 schematically illustrates color conversion matrices obtained in this manner for various illumination light sources. The illustrated examples comprise a color conversion matrix A for incandescent lighting, a color conversion matrix B for fluorescent lighting, a color conversion matrix C for sunlight, and a color conversion matrix D for overcast light. Matrix elements obtained by the least squares method have been established in each matrix.

Such matrices are stored while associated with illumination light source types in the storage circuit 1110 of the digital camera 1100 shown in FIG. 17. In the image data output process in FIG. 18, the RGB image data obtained from the CCD undergoes color conversion with the use of a color conversion matrix according to the illumination light source in this manner, so that coordinates are converted to the proper XYZ values close to the colorimetric values. Conversion to the proper XYZ values in this manner will allow the original image colors to be properly reproduced by subsequent coordinate conversion as needed to the color space of the output device used to reproduce the image or various types of correction such as white balancing or gamma correction.

In the aforementioned image data output process, the description concerned the use of a color conversion matrix for the coordinate conversion of the RGB image data, obtained by the CCD, according to the illumination light source. However, other methods can also be used as the method for the color conversion of the image data not just color conversion matrices. For example, color conversion look-up tables associated with the illumination light sources can be used for the coordinate conversion of the image data to a suitable color space.

Figure 26:
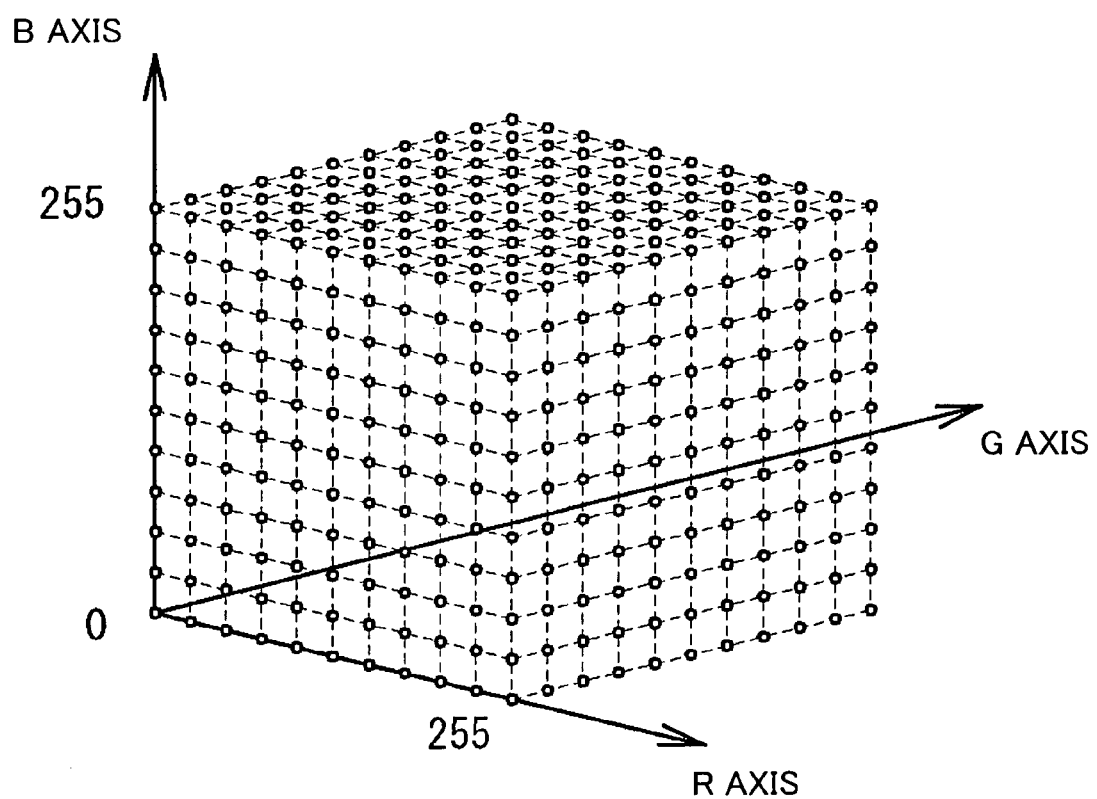
FIG. 26 schematically illustrates a color conversion table for an illumination light source.

FIG. 26 schematically illustrates a color conversion table established according to the illumination light source. As illustrated, the color conversion table can be considered a three-dimensional mathematical table in which the R, G, and B coordinate axes are three mutually intersecting axes, and the corresponding XYZ value are recorded at coordinates of a lattice produced by further subdividing the axes. Such a color conversion table can be used as reference for the coordinate conversion of the RGB image data in the following manner to the XYZ color space image data. For example, one coordinate point corresponding to the image data can be determined in the space where the R, G, and B in FIG. 26 are the three axes, and the RGB image data is (r, g, b). When the resulting coordinate point is consistent with a lattice point, the XYZ values corresponding to the RGB image data r, g, and b can be obtained simply by reading the XYZ values on the lattice points. When the coordinate points corresponding to the RGB image data are not consistent with the lattice points, the XYZ values corresponding to the RGB image data r, g, and b can be calculated by interpolation from the XYZ values established at surrounding lattice points.

Color conversion done in this manner with reference to the color conversion table readily permits the color conversion of nonlinear properties by establishing the appropriate XYZ values at the lattice points. Better coordinate conversion of image data to color space data according to the illumination light source is thus possible. Meanwhile, the use of color conversion matrices for color conversion as described above affords the advantage of being able to limit memory volume. That is, since the amount of memory needed to record color conversion matrices is far lower than the amount of memory needed to record color conversion tables, no large memory volume is needed to store various types of color conversion matrices according to various types of illumination light source.

I. Eighth Embodiment

In the seventh embodiment described above, image data is output after color conversion according to the illumination light source, but images can also be reproduced after coordinate conversion of image data according to the illumination light source. This will be described in the eighth embodiment below.

I1. Image Data Output Process in Eighth Embodiment

Figure 27:
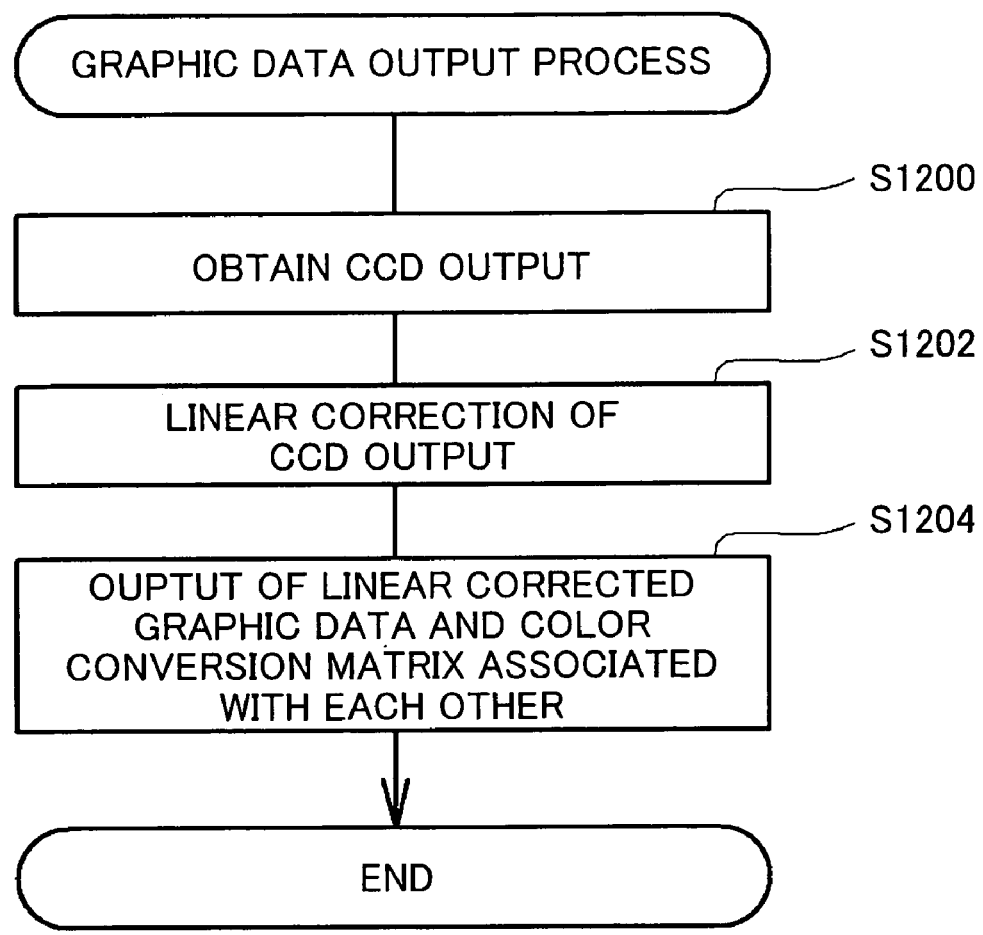
FIG. 27 is a flow chart of the course of a process for the output of image data in an 8th embodiment.

FIG. 27 is a flow chart of the course of a process for the output of image data in the eighth embodiment. The major difference in the image data output process in the eighth embodiment in relation to that in the seventh embodiment described above is that conversion parameters(correction parameters) are output associated with the image data instead of performing the coordinate conversion of the image data according to the illumination light source. The image data output process of the eighth embodiments is briefly described below, centering mainly on this difference.

In the image data output process in the eighth embodiment, the image of the photographed subjects is first focused on the CCD of the image acquisition circuit 1104 to obtain the CCD output of the R, G, and B colors before the process is started in the same manner as in the seventh embodiment (Step S1200). Other optical sensors such as CMOS sensors can also be used instead of the CCD. The resulting RGB color CCD output is then converted by linear correction to data in which the RGB color image data is properly proportional to the light intensity (Step S1202). This conversion is done with reference to the one-dimensional table in FIG. 20 in the same manner as in the seventh embodiment. Of course, the linear correction can also be omitted, just as it may in the seventh embodiment.

The linear corrected RGB image data and the pre-stored plurality of color conversion matrices are output while associated with each other (Step S1204). A plurality of color conversion matrices are pre-stored in the storage circuit 1110 of the digital camera 1100. The plurality of color conversion matrices are output while written to the header of the RGB image data. The cursor 1116 can be used, for example, to select an appropriate color conversion matrix that is output associated with the RGB image data. The color conversion matrix is stored according to the type of illumination light source (such as incandescent light or sunlight), and the matrix associated with the illumination light source which is used to take the photograph is selected. Of course, a plurality of color conversion tables may be recorded instead of the color conversion matrices, and the data can be output while associated with these tables.

Figure 28:
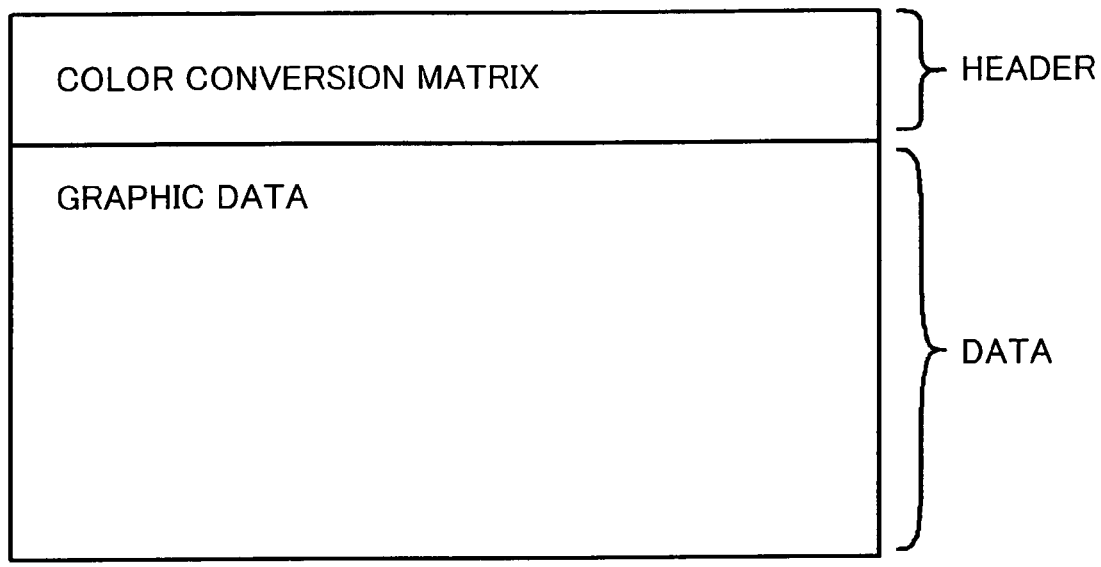
FIG. 28 schematically illustrates the data structure of the image data, with the illumination light source data written in the header.

FIG. 28 schematically illustrates the data structure of the image data, with the color conversion matrix (or color conversion table) written in the header. The way in which the RGB image data and the color conversion matrix (or color conversion table) are associated with each other is not limited to the color conversion matrix being written to the image data header. For example, the image data and the color conversion matrix may be stored as separate files, and may be associated with each other by at least partially sharing file names, or they may be associated with each other by extending hyperlinks between files.

The image data output process in the eighth embodiment in FIG. 27 is concluded when the image data and color conversion matrix are output while associated with each other as described above (Step S1204). When the image data associated with the color conversion matrix in this manner is received in the eighth embodiment, the image is properly reproduced according to the illumination light source by the following process.

I2. Image Reproducing Process in Eighth Embodiment

Figure 29:
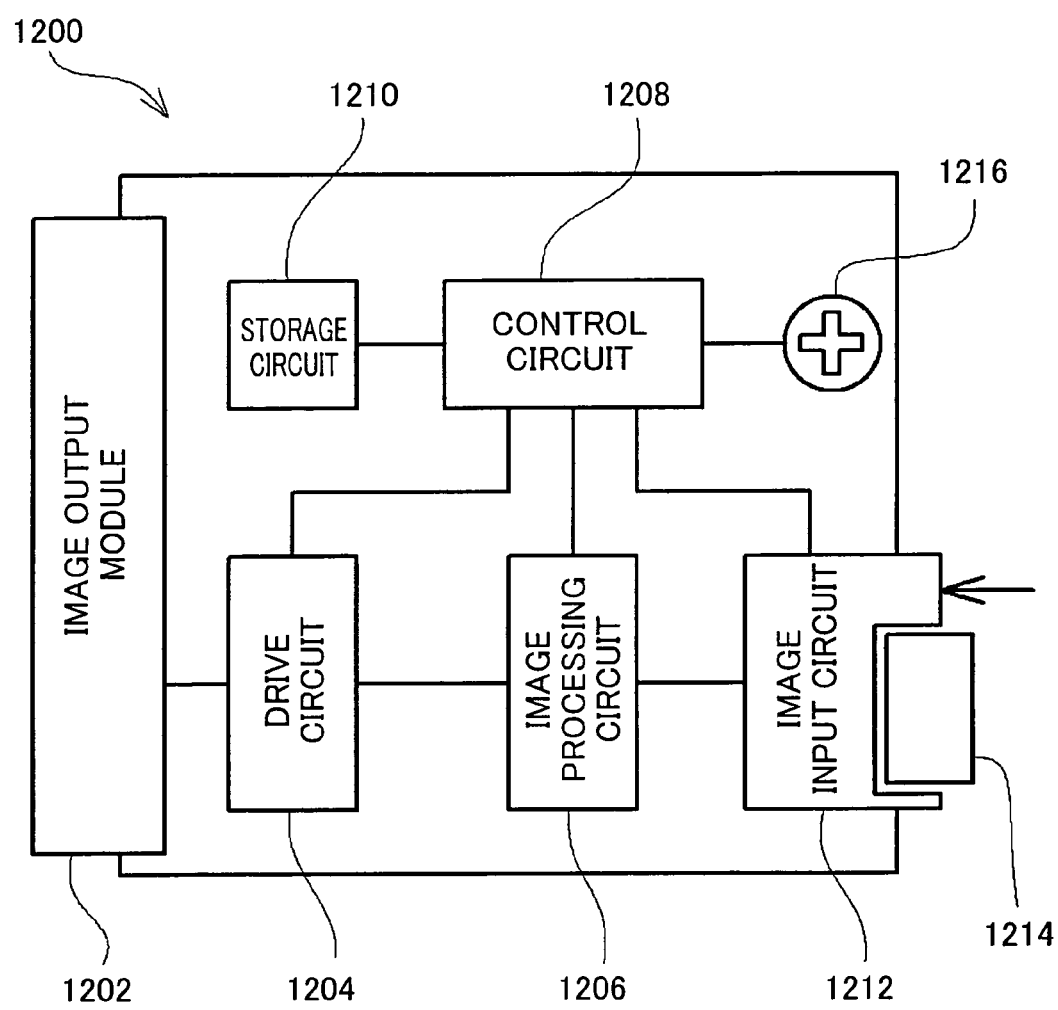
FIG. 29 illustrates the general structure of an image reproducing device for reproducing images upon the retrieval of image data in the 8th embodiment.

FIG. 29 illustrates the general structure of an image reproducing device 1200 for reproducing images upon receipt of image data in the eighth embodiment. Various output devices such as liquid crystal monitors, CRT monitors, and projectors can be used as the image reproducing device 1200.

As illustrated, the image reproducing device 1200 comprises an image output module 1202 composed mainly of a liquid crystal screen, or CRT screen; a drive circuit 1204 for driving the image output module 1202; an image input circuit 1212 for receiving externally provided image data; an image processing circuit 1206 for running a certain image process on the image data input from the image input circuit 1212; a control circuit 1208 for controlling the operations of the circuits 1204, 1206, 1212; a storage circuit 1210 for storing the various types of data needed for image processing and control; and a cursor 1216 for various settings in the control circuit 1208. The image output circuit 1212 receives image data through storage elements 1214 such as memory cards in addition to image data through cables.

In the image reproducing device 1200 of the eighth embodiment having this type of structure, the following process is performed upon the receipt of the illumination light source data along with the image data to allow the image to be properly reproduced, regardless of the illumination light source used to produce the data.

Figure 30:
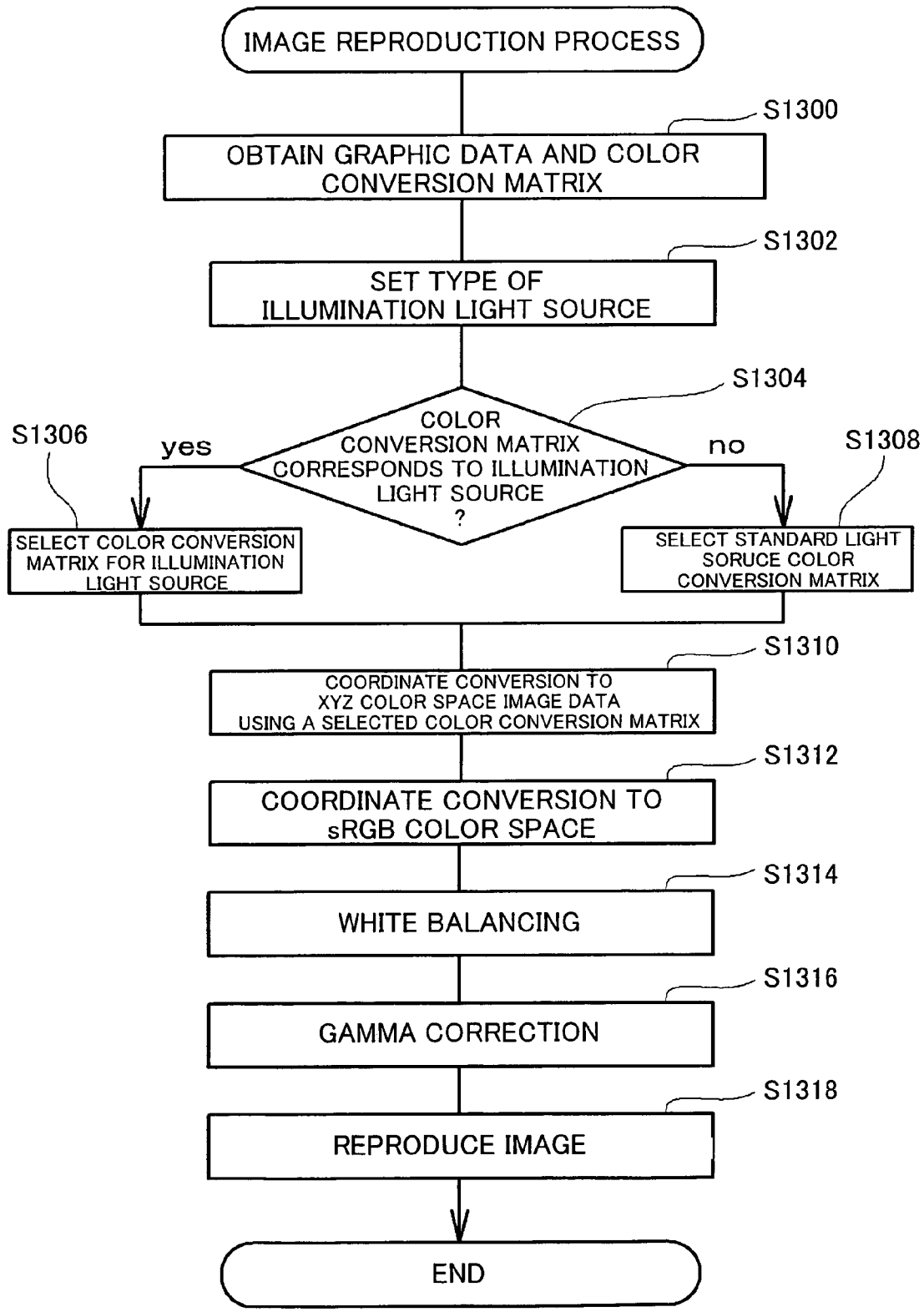
FIG. 30 illustrates the course of a process in which the image reproducing device of the 8th embodiment reproduces images upon the receipt of the image data and illumination light source data.

FIG. 30 illustrates the course of the process in which the image reproducing device of the eighth embodiment reproduces images upon the receipt of the image data and a color conversion matrix (or color conversion table). This is described below according to the flow chart. When the image reproducing process is started, the image data and color conversion matrix (or color conversion table) are first obtained (Step S1300). The image data is RGB image data produced by the image data output process using FIG. 27. the color conversion matrix (or color conversion table) is associated with the data. In Step S1300, the RGB image data and color conversion matrix (or color conversion table) are read.

The setting for the type of the illumination light source (such as incandescent lighting, sunlight, or fluorescent lighting) is then obtained (Step S1302). The type of the illumination light source is set using the cursor 1216 on the control circuit 1208 of the image reproducing device 1200, and the settings are obtained. Alternatively, data related to the illumination light source may be associated with the image data by the digital camera 1100, and the type of the illumination light source can be obtained based on this data.

When the type of the illumination light source has been obtained, it is determined whether or not the color conversion matrix that is read along with the image data is the color conversion matrix (or color conversion table) suitable to the illumination light source (Step S1304).

When the color conversion matrix thus read is suitable to the illumination light source (Step S1304: yes), the color conversion matrix is selected (Step S1306). A plurality of color conversion matrices may have been stored in the storage circuit 1210 of the image reproducing device 1200, and when the read color conversion matrix is not suitable to the illumination light source, another color conversion matrix that is associated with the illumination light source may be selected from the matrices in the storage circuit. If no color conversion matrix suitable to the illumination light source is available (Step S1304: no), a matrix that has been preset as a standard color conversion matrix is selected from among the plurality of color conversion matrices stored in the storage circuit 1210 (Step S1308).

The selected color conversion matrix is used for the coordinate conversion of the RGB image data to obtain XYZ color space data (Step S1310). The aforementioned color conversion matrix is then applied, using FIG. 21, to the resulting XYZ color space image data for coordinate conversion to obtain sRGB color space image data (Step S1312). As noted above, natural images can be reproduced by most image reproducing devices through the coordinate conversion of the image data to sRGB color space data.

The externally supplied RGB image data does not undergo coordinate conversion immediately to sRGB color space data, but first undergoes color conversion to XYZ color space image data. The XYZ image data which has properly undergone color conversion by taking into consideration the effects of the illumination light source is thus obtained and output to another device, allowing image data to be obtained without any deterioration in accuracy.

When sRGB color space image data has been obtained as described above, the image data is white balanced (Step S1314). That is, the gain of the R, G, and B colors is adjusted according to the light source, allowing white to be photographed a white, in a manner corresponding to the color adaptation function of human perception. Gamma correction is then performed on the white balanced image data (Step S1316), and the resulting image data is used to reproduce the image (Step S1318).

Reproducing the image in this way permits proper color conversion according to the illumination light source, making it possible to properly reproduce images taken under any illumination light source.

In the above eighth embodiment, one color conversion matrix is written to the image data header. However, a plurality of color conversion matrices can be associated with the image data. A color conversion table can also be associated instead of (or along with) a color conversion matrix.

Figure 31:
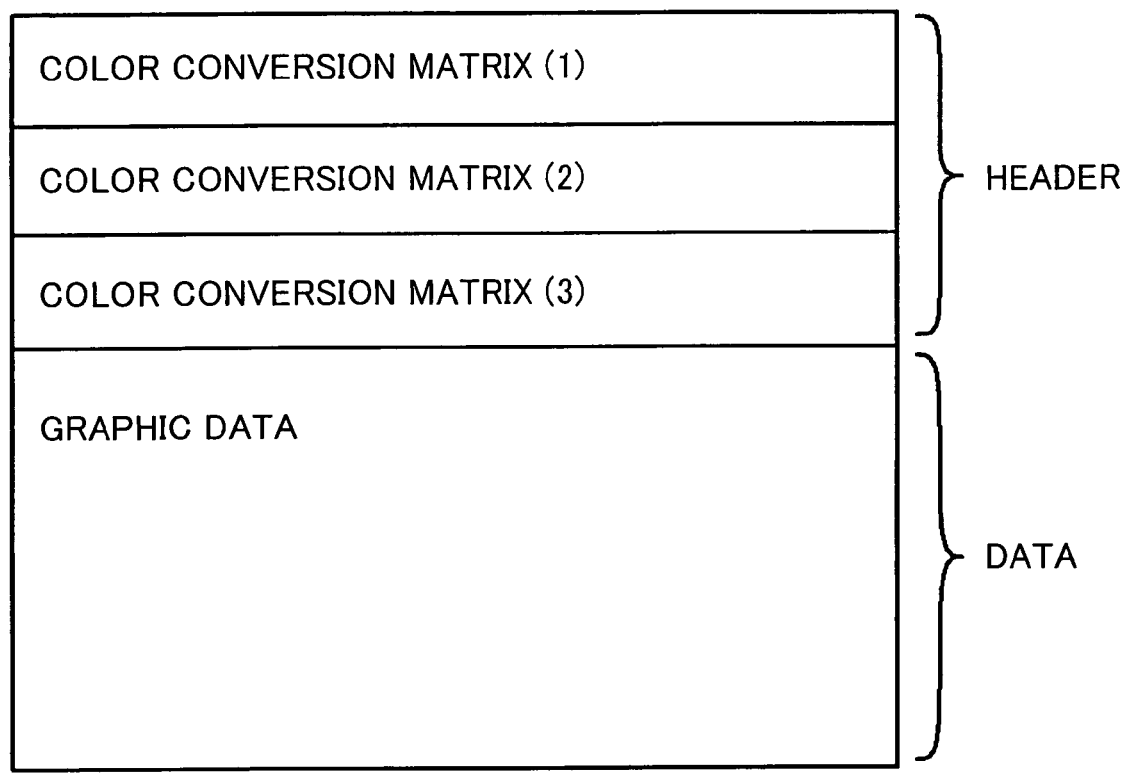
FIG. 31 schematically illustrates the data structure of the image data, with a plurality of illumination light source data written in the header.

FIG. 31 schematically illustrates the data structure of the image data, with a plurality of color conversion matrices written in the header. In this embodiment, three color conversion matrices are written to the image data header. The association of a plurality of color conversion matrices (or color conversion tables) with the image data in this manner permits more flexible reproduction on various types of devices for reproducing image data. A color conversion matrix corresponding to the illumination light source used for the photography is written to the color conversion matrix (1), for example. Different color conversion matrices can be written to the color conversion matrix (2) and color conversion matrix (3). This will allow high quality images to be reproduced in which the original image colors are accurately represented through coordinate conversion using the color conversion matrix (1) in an image output device. The color conversion matrix (2) or color conversion matrix (3), on the other hand, can be used for coordinate conversion to enhance the expressive freedom in order to reproduce even higher quality images.

In the eighth embodiment described above, a plurality of color conversion matrices are stored according to various light sources in the storage circuit 1210 of the image reproducing device 1200, and a color conversion matrix suitable to the illumination light source or a standard color conversion matrix is selected. The color conversion tables in FIG. 26 can be stored instead of the color conversion matrices in the storage circuit 1210.

J. Variants

J1. Variant 1

In the first through sixth embodiments, the achromatic object color ranges are set using "Cr/Y" and "Cb/Y" coordinates (FIG. 5), but they can also be set using other color components (such as saturation S, luminance Y, and hue H). Various types of saturation values can be used as the saturation S, such as S of HSL (hue/saturation/luminance) color space and S of HSB (hue/saturation/brightness) color space.

Various types of brightness or luminance can also be used as the luminance Y, and various types of hue values can be used as the hue H.

Various ranges which are different from the range illustrated in FIG. 5 can be used for the achromatic object color ranges. However, it is preferable to use as one of the achromatic object color ranges a locus achromatic object color range which includes the locus of colors exhibited by an achromatic object in response to changes in color temperature. For instance, in the embodiment in FIG. 5, the achromatic object color range STDR along the Planckian locus P, including the Planckian locus P, is used as a locus achromatic object color range, the use of such a locus achromatic object color range will allow color balancing to be done so as to reduce colorcast at various color temperatures. Afternoon sunlight locus determined by CIE (International Commission on Illumination) may be used instead of the Planckian locus as such a color locus.

A plurality of light source achromatic object color ranges exhibiting the colors of certain light may be set according to various light sources for use as achromatic object color ranges. This will allow colorcast caused by the colors of various types of light sources to be reduced. Ranges related to various types of natural light, not just ranges of color related to artificial light sources, may be used as achromatic object color ranges. In the above embodiment (FIG. 5), a range along the Planckian locus P and including the Planckian locus P (standard achromatic object color range STDR) is used as an achromatic object color range for natural light, but narrower color ranges may be used instead. For example, an achromatic object color range exhibiting the natural light of clear skies (sunlight) may be used, and an achromatic object color range exhibiting natural light on overcast days may be used. The expression "achromatic object color ranges exhibiting the colors of specific light sources" means ranges near the colors of certain light sources, and means ranges which include colors exhibited by achromatic objects when achromatic objects are viewed under such light sources.

Artificial light sources include colors that are separate from the loci of colors (such as the Planckian locus) in response to changes in color temperature, such as fluorescent light. Non-locus achromatic object color ranges which do not include color loci and which do include colors other than locus achromatic object color ranges may be established for use separately from the locus achromatic object color ranges. In the embodiment in FIG. 5, fluorescent light range FLR is used as a non-locus achromatic object color range. The use of a locus achromatic object color range and a non-locus achromatic object color range in this way allows pixels having colors near color loci and pixels with color separate from color loci (such as fluorescent light colors) to be used to calculate color balance correction values without overly expanding the achromatic object color ranges. As a result, colorcast biased toward colors along color loci and colorcast biased to colors separate from color loci can be properly reduced.

In the embodiments of color conversion processes shown in FIGS. 9 through 11, and 12 through 14, it is preferable that locus achromatic object color ranges and light source achromatic object color ranges exhibiting the colors of certain light sources are used as the achromatic object color ranges.

J2. Variant 2

In the embodiment in FIG. 4, various values other than those based on the standard range cumulative value can be used as the threshold in Step S210. For example, values calculated based on the total number of pixels within an achromatic color range in the image targeted for processing can be used. For example, values that are proportional to the total number of pixels or values involving the use of square roots of the total number of pixels can be used. Examples of the values proportional to the total number of pixels includes the number of pixels which are plotted proximate at the gravitational center of the standard range STDR in cases where it is assumed that a constant proportion (such as 2%) of the total number of pixels (the "standard central color pixels" referred to above) are to be plotted proximate at the gravitational center of the standard range STDR. The colors of such pixels will be referred to as "standard gravitational center colors". Preset values may be used as the threshold value. For example, it is possible to use cumulative size values calculated using the standard gravitational center color pixels when it is assumed that there are more than a certain number (such as 10,000) of standard gravitational center color pixels. In this case, the threshold value determining module 232 (FIG. 2) can be omitted. However, the threshold value may be a value that is greater the greater the total number of pixels within an achromatic color range.

When the threshold value is a relatively small value, it will be more difficult to select achromatic object color ranges other than achromatic object color ranges having the greatest size index value. Conversely, when the threshold value is a relatively greater value, it will be easier to select achromatic object color ranges other than achromatic object color ranges having the greatest size index value. Here, the threshold value may be set to a value allowing the selection of an achromatic object color range exhibiting colorcast. The threshold value can be experimentally set, for example, based on the results of the adjustment of images with various types of colorcast.

J3. Variant 3

In the first through sixth embodiments, the cumulative gray scale levels of some color components (such as just the G component) may be used instead of the total cumulative gray scale level of all color components as the cumulative size value. The cumulative gray scale level of color components of other color spaces (such as the luminance Y of YCbCr color space) may also be used as the cumulative size value.

A variety of index values expressing the size of the number of pixels of colors within the achromatic object color range of the image targeted for processing can also be used instead of the cumulative size value as the "size index value" or "population index value". For example, the total number of pixels having colors within the achromatic object color range may be used as the "size index value" or "population index value". In either case, threshold values for comparing the size index values (FIG. 4: Step S210; FIG. 11: Step S410; FIG. 14: Step S610) can be used in the same way that cumulative size values are. For example, when the number of pixels is used as the size index value, the value obtained by multiplying the size index value in the standard achromatic object color range (number of pixels having colors within the standard achromatic object color range) by a constant proportion (such as 10%) can be used as the threshold value. Alternatively, the value obtained by multiplying the total number of pixels contained in the image targeted for processing by a constant proportion (such as 2%) can be used as the threshold value.

When the number of pixels within an achromatic color range is used as the size index value, the color balance correction value can be calculated in the same manner as in FIG. 4. First, in Step S200, the size index value computing module 230 (FIG. 2) calculates the number of pixels, or size index value, by selecting achromatic object color pixels for every achromatic object color range. The achromatic object color range selecting module 220 then selects an achromatic object color range based on the calculated size index value (Steps S210 through S250). In the next Step S260, the color balance correction value computing module 224 calculates the color balance correction value by adding the gray scale level of pixels having colors within the selected achromatic object color range.

J4. Variant 4

In the embodiments in FIGS. 4 and 5, a locus achromatic object color range is used as the standard achromatic object color range, but any achromatic object color range in the plurality of achromatic object color ranges can be used as the standard achromatic object color range. In this case, in Step S210 of FIG. 4, the cumulative size value of the standard achromatic object color range (standard range cumulative value) is compared with the greatest cumulative size value for the other achromatic object color ranges ("target range maximum cumulative value"). Here, when there is a major difference between the standard range cumulative value and the target range maximum cumulative value, the achromatic object color range selecting module 220 selects only the achromatic object color range with the greatest cumulative value among all the achromatic object color ranges, in the same manner as in Steps S230 and S240 in FIG. 4. Meanwhile, when the target range maximum cumulative value is close to the standard range cumulative value, the achromatic object color range in which the cumulative size value is close to the standard range cumulative value is be selected, in the same manner as in Step S250 of FIG. 4.

In images with colorcast, the colors of the image are often biased toward the color loci. Thus, when locus achromatic object color ranges are used as the standard achromatic object color range, the color balance correction value can be calculated, weighting the locus achromatic object color range, thereby preventing the color balance of the image from being improperly adjusted.

In the embodiments in FIG. 11 and FIG. 14, any achromatic object color ranges can similarly be used as the standard achromatic object color range. However, it is preferable that a locus achromatic object color range is be used as the standard achromatic object color range. This will allow color conversion conditions in which weight is given to the locus achromatic object color range to be selected in Steps S410 in FIG. 11 or Step S610 in FIG. 14, thereby preventing the image color from being improperly adjusted.

J5. Variant 5

In Step S250 of the embodiment in FIG. 4, the achromatic object color range selecting module 220 (FIG. 2) selects an achromatic object color range in which the size index value is near that of the standard achromatic object color range ("standard range size index"). In this case, the achromatic object color range selecting module 220 selects an achromatic object color range having a size index value within an acceptable range. The acceptable range may be a range in which the maximum is the "standard range cumulative value+the threshold value" and the minimum is the "standard range cumulative value−the threshold value". That is, the acceptable range corresponds to the "standard permissible range" or "permissible value range" in the invention. However, various ranges independent of the threshold value used in Steps S210 can be used as the "standard permissible range" or "permissible value range".

Various ranges determined on the basis of the standard range size index may be used as the "standard permissible range" or "permissible value range". For example, a permissible range which is broader proportionally to the standard range size index or a permissible range which is broader proportionally to the square root of the standard range size index can be used. For example, the achromatic object color range selecting module 220 (FIG. 2) can calculate the value obtained by multiplying the standard range size index by a constant proportion (such as 10%) as a standard difference, and a range in which the difference from the standard range size index is within the standard difference may be used as the "standard permissible range" or "permissible value range".

Various ranges determined on the basis of the total pixels contained in the image targeted for treatment may also be used as the "standard permissible range" or "permissible value range". For example, a permissible range that is broader proportionally to the total number of pixels or a permissible range that is broader proportionally to the square root of the total number of pixels can be used. For example, when it is assumed that the aforementioned standard gravitational center color pixels account for a constant proportion (such as 2%) of the total number of pixels, the achromatic object color range selecting module 220 may calculate the size index value calculated using the standard gravitational center color pixels, as the standard difference, and a range in which the difference from the standard range size index is within the standard difference may be used as the standard permissible range.

The standard permissible range (permissible value range) need not be a symmetrical range centered on the standard range size index. It may be a partial range including the standard range size index among all the ranges in which the size index value can take a value. In this case, it is preferable that the standard permissible range is a range greater than 0, and it is even more preferable that the standard permissible range will include the maximum size index value. A range which will not result in the selection of an achromatic object color range with too little a possibility exhibiting colors deviating from achromatic colors may be set as the standard permissible range. For example, it can be established based on the results of the adjustment of image with various types of colorcast.

J6. Variant 6

Various methods for selecting achromatic object color ranges based on the image targeted for processing can be used as methods in which the achromatic object color range selecting module 220 (FIG. 2) selects the achromatic object color range. For example, the achromatic object color range with the greatest size index value out of all the achromatic object color ranges may be selected. In this case, it is possible to select only the achromatic object color range with the greatest size index value without giving priority to one particular achromatic object color range as the standard achromatic object color range. This is equally true of the third embodiment in FIG. 9 and the fourth embodiment in FIG. 12.

J7. Variant 7

The following types of methods may be used as the method in which the achromatic object color range selecting module 220 (FIG. 2) selects the achromatic object color range. For example, when the difference in the size index values is relatively small between the achromatic object color range having the greatest size index value and the achromatic object color range having the second greatest value, the two achromatic object color ranges may be selected. Specifically, two achromatic object color ranges may be selected when the difference of the second greatest size index value subtracted form the greatest size index value is equal to or less than the difference threshold. When the difference in the size property threshold is relatively small, there is a high possibility that the colors of the two achromatic object color ranges will exhibit colors deviating from achromatic colors. The selection of the two achromatic object color ranges may result in a more suitable color balance correction value for the image targeted for processing. In the first embodiment in FIG. 4, the two achromatic object color ranges with the greatest size index values may be selected in Step S250. At that time, the threshold determined by the threshold value determining module 232 corresponds to the "difference threshold" in the invention.

Various values calculated based on the standard range size index may be used as the difference threshold. For example, values proportional to the standard range size index or its square root may be used. The value obtained by multiplying the standard range size index by a constant proportion (such as 10%) may be used, for example, as a proportional value to the standard range size index.

Various values calculated based on the total number of pixels in the image targeted for processing may be used as the difference threshold. For example, values proportional to the total number of pixels or values involving its square root may be used. When the aforementioned standard gravitational center color pixels account for a constant proportion (such as 2%) the total number of pixels, for example, the size index value calculated using the standard gravitational center color pixels can be used as proportional values to the standard range size index. Preset values may also be used instead. For example, when it is assumed that the standard gravitational center color pixels are more than a predetermined number (such as 10,000), a size index value calculated using such standard gravitational center color pixels can be used. The difference threshold can be experimentally set based on the results of the adjustment of images with various types of colorcast. The two greatest achromatic object color ranges may be selected without giving priority to one particular achromatic object color range as the standard achromatic object color range.

The above variants are described with reference to the first embodiment in FIG. 4, but the threshold value used in Step S410 of the procedure in FIG. 11 can be similarly determined. In the third embodiment in FIG. 11, when the difference between the standard range size index and the greatest size index value for the other achromatic color ranges is equal to or lower than the difference threshold (Step S410: no), the standard color conversion matrix can be selected (Step S430). The threshold (corresponding to the "standard threshold value") can be determined in the same manner as the difference threshold above. If the standard threshold value is relatively small, the color conditions of the achromatic object color range having the greatest size index value can be actively selected. Conversely, if the standard threshold is relatively large, the standard color conversion conditions can be actively selected. The same is true of the threshold value used in Step S610 of the procedure in FIG. 14.

J8. Variant 8

Methods such as the following can be used as the method in which the achromatic object color range selecting module 220 (FIG. 2) selects the achromatic object color range. For example, an achromatic object color range in which the size index value is at or greater than the lower limit value may be selected. As noted above, the colors of the entire image tend to be biased toward certain colors (such as light source colors) in images that have colorcast. There is thus a high possibility that the colors of achromatic object color ranges in which the size index value is too little will exhibit colors different from colors deviating from achromatic colors. The selection of achromatic object color ranges having size index values at or over the lower limit value can prevent pixel values of pixels which have a low possibility of exhibiting colors deviating from achromatic colors from being used to calculate color balance correction values, thereby allowing permitting more suitable color balancing of images targeted for processing. In the first embodiment in FIG. 4, an achromatic object color range in which the size index value is equal to or greater than the "standard range cumulative value–threshold value" is selected in Step S250. That is, "standard range cumulative value–threshold value" corresponds to the "lower limit value" in the invention.

Various values calculated based on the standard range size index may be used as the lower limit value. For example, values proportional to the standard range size index or its square root may be used. Values obtained by multiplying the standard range size index by a constant proportion (such as 20%) may be used as proportional values to the standard range size index.

Various values calculated based on the total number of pixels contained in the image targeted for processing may be used as the lower limit value. For example, values proportional to the total number of pixels or its square root may be used. Examples of proportional values that can be used include a size index value calculated using the standard gravitational center color pixels in cases where it is assumed that a constant proportion (such as 5%) of the total number of pixels is plotted proximate at the gravitational center of the standard range STDR. The lower limit value can be experimentally set based on the results of the adjustment of images with various types of colorcast. It is possible to select all the achromatic object color ranges having a size index value equal to or greater than the lower limit value without giving priority to one particular achromatic object color range as the standard achromatic object color range. The lower limit value is preferably greater than 0.

J9. Variant 9

Methods such as the following can be used as the method in which the achromatic object color range selecting module 220 (FIG. 2) selects the achromatic object color range. For example, it is possible to select an achromatic object color range which includes a coordinate point at which a peak number of pixels are present in the pixel distribution in the color space shown in FIGS. 6(*b*), 6(*d*), and 6(*f*). Specifically, the achromatic object color range selecting module 220 divides the range near achromatic colors in the color space into a plurality of sections, and calculates the number of pixels in those sections. The achromatic object color ranges containing sections having the greatest number of pixels (populous sections) may then be selected. When the populous sections are outside the achromatic object color range, the achromatic object color ranges containing the sections having the greatest number of pixels among the sections contained in the achromatic object color ranges are selected. The size of each section is preferably smaller than the achromatic object color ranges. In this case, the size index value computing module 230 and the threshold value determining module 232 can be omitted.

The achromatic object color range selecting modules 220*a* and 220*b* in the embodiments in FIGS. 9 and 12 can similarly select achromatic object color ranges containing a coordinate point with peak numbers of pixels.

J10. Variant 10

Various methods for calculating the color balance correction value based on the number of pixels of the selected achromatic object color pixels can be used instead of the methods used above to calculate the color balance correction value. For example, the average AveR, AveG, and AveB of the gray scale levels of RGB colors in the achromatic object color range selected by the achromatic object color range selecting module 220 may be used instead of the RGB color correction cumulative values CSumR, CSumG, and CSumB in Equations (2a) through (2c). In this case, the correction value is determined based on the deviation between the colors represented by the average value and the achromatic colors based on the G component.

The correction value may be based on the cumulative luminance Y (or the average luminance Y when the average value is used) instead of the G component correction cumulative value CSumG (the G component average value AveG when the average value is used) in the aforementioned Equations (2a) through (2c).

J11. Variant 11

Some of the pixels contained in the image data targeted for processing may be skipped when calculating the color balance correction value in the above embodiments. For example, achromatic object color pixels may be selected from the pixels left over (such as the pixels left over when 3 pixels are skipped every other pixel) when pixels are uniformly skipped at a constant proportion. Similarly, some pixels contained in image data targeted for processing may be skipped when calculating the size index value.

J12. Variant 12

In the above embodiments, the standard achromatic object color range STDR and other achromatic object color ranges (such as the incandescent light range INR and fluorescent light range FLR) are used (FIG. 5), and the range of overlapping colors is excluded from the standard achromatic object color range STDR. Alternatively, the range of colors where the incandescent light range INR and standard range STDR overlap may be excluded from the incandescent light range INR, and can be included in the standard range STDR. In the same manner, the range of colors where the fluorescent light range FLR and standard range STDR overlap can also be excluded from the fluorescent light range FLR and included in the standard range STDR. In general, the range of colors where more than one achromatic object color range overlap can be included in just one specific achromatic object color range. This will allow the size index values of the achromatic object color ranges to be readily calculated.

The range of colors where more than one achromatic object color range overlap may also be shared by overlapping achromatic object color ranges. For example, in the embodiment in FIG. 5, the range where the fluorescent light range FLR and standard achromatic object color range STDR overlap may be included in both the fluorescent light range FLR and standard achromatic object color range STDR. This will allow suitable size index values of the achromatic object color ranges to be produced for the image targeted for processing, even when there is a broad range of colors where the different achromatic object color ranges overlap.

In either case, it is preferable that the number of overlapping achromatic object color ranges is 3 or more.

J13. Variant 13

In the above embodiments, the computer 200 comprises a print data generating module 216 for generating print data usable by the printer 300, but a display data generating module for generating display data usable by an image display device such as an LCD display or projector can be provided instead. This will allow images to be displayed based on color balanced image data. The computer 200 may also comprise an image file generating module for generating an image file containing color adjusted image data. In the above embodiments, the computer 200 had the functions of the color adjusting modules 214, 214a, and 214b, but the functions of the color adjusting modules 214, 214a, and 214b may be given to an image generating device such as the digital camera 100, or to an image output device such as the printer 300 or LCD display.

In the Specification, "digital camera" includes digital still cameras that take still pictures, and to digital video cameras that take motion pictures.

J14. Variant 14

In the above embodiments, part of the structure realized by the hardware may be replaced by software. Conversely, part of the structure realized by the software maybe replaced by hardware.

J15. Variant 15

In the seventh and eighth embodiments, the image data is RGB image data. The RGB image data may also undergo coordinate conversion to CMY color space based on cyan (C), magenta (M), and yellow (Y), or the XYZ image data can undergo coordinate conversion to CMY color space. Meanwhile, in the seventh and eighth embodiments, the coordinate conversion corresponds to the "color correction" or "color space coordinate conversion" in the invention. And the color conversion matrix and the color conversion look-up table correspond to the "conversion parameter" or "correction parameter" in the invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device for adjusting colors in an image targeted for processing, comprising:
an achromatic-object color range selecting module configured to establish a plurality of achromatic-object color ranges each including some colors of an achromatic photographed object in the image targeted for processing, and to select at least one of the plurality of achromatic-object color ranges based on the image targeted for processing; and
a color adjustment processing module configured to perform a color adjusting process on the image targeted for processing based on the selected achromatic-object color range,
wherein the color adjustment processing module includes
a color balance correction value computing module configured to compute a color balance correction value based on pixel values of achromatic-object-color pixels which have color within the selected achromatic-object color range among pixels of the image targeted for processing, and
a color balancing module configured to perform color balancing on the entire image targeted for processing using the color balance correction value,
wherein the achromatic-object color range selecting module includes
a population index value computing module configured to compute, with respect to each achromatic-object color range, a population index value correlated to the number of pixels having colors within the achromatic-object color range, and
the achromatic-object color range selecting module selects at least that achromatic-object color range which has the greatest population index value among the plurality of achromatic-object color ranges, and wherein the achromatic-object color range selecting module has a two-range selection mode for additionally selecting the achromatic-object color range having a second greatest population index value when a difference of the second greatest population index value and the greatest population index value is less than a difference threshold.

2. An image processing device according to claim 1, wherein
the plurality of achromatic-object color ranges include a predetermined standard achromatic-object color range, and
the achromatic-object color range selecting module has a permissible-range selection mode for selecting one or more achromatic-object color ranges which have a population index value within a permissible value range, the permissible value range including a population index value of the standard achromatic-object color range.

3. An image processing device according to claim 1, wherein
the achromatic-object color range selecting module has a lower-limit selection mode for selecting one or more achromatic-object color ranges having a population index value which is more than a lower limit value.

4. An image processing device according to claim 1, wherein
a pair of the achromatic-object color ranges have an overlapping color range, and
the population index value computing module uses pixels values of pixels included in the overlapping color range in the computation of the population index value for both of the achromatic-object color range pair.

5. An image processing device according to claim 1, wherein
a pair of the achromatic-object color ranges have an overlapping color range, and
the population index value computing module use pixels values of pixels included in the overlapping color range in the computation of the population index value for only one of the achromatic-object color range pair.

6. An image processing device according to claim 1, wherein
the color adjustment processing module includes:
a plurality of color conversion profiles associated with the plurality of achromatic-object color ranges, respectively;
a color conversion profile selecting module configured to select a color conversion profile associated with the selected achromatic-object color range from among the plurality of color conversion profiles, and
a color conversion executing module configured to execute a color conversion process on the image targeted for processing according to the selected color conversion profile.

7. An image processing device according to claim 6, wherein
the plurality of achromatic-object color ranges are each associated with a specific light source.

8. An image processing device according to claim 7, wherein
each particular profile of the color conversion profiles is made so that a first color difference between a first processed color value for a predetermined color sample and a colorimetric value of the color sample is smaller than a second color difference between a second processed color value for the color sample and the colorimetric value, the first processed color value being obtained by executing the color conversion process using the particular color conversion profile on a sample image of the color sample photographed under a light source associated with the achromatic-object color range, the second processed color value being obtained by executing the color conversion process on the sample image using another color conversion profile.

9. An image processing device according to claim 8, wherein
the color sample includes color patches in a standard color chart, and
the color conversion profiles are made so that a sum of the first color differences for the color patches is less than a sum of the second color differences for the color patches.

10. An image processing device according to claim 6, wherein
one of the achromatic-object color ranges is pre-selected as a standard achromatic-object color range which is associated with a standard color conversion profile, and
at least one particular profile of the plurality of color conversion profiles other than the standard color conversion profile is made so that first saturation of color obtained by the color conversion process using the particular color conversion profile is less than second saturation of color obtained by the color conversion process using the standard color conversion profile.

11. An image processing device according to claim 10, wherein
the achromatic-object color range selecting module further includes:
a population index value computing module configured to compute, with respect to each achromatic-object color range, a population index value correlated to the number of pixels having colors within the achromatic-object color range, and
the achromatic-object color range selecting module has a standard selection mode for selecting the standard achromatic-object color range when a difference between a population index value of the standard achromatic-object color range and the greatest population index value among the population index values of the plurality of achromatic-object color ranges is less than a standard threshold.

12. An image processing device according to claim 11, wherein
a pair of the achromatic-object color ranges have an overlapping color range, and
the population index value computing module uses pixels values of pixels included in the overlapping color range in the computation of the population index value for both of the achromatic-object color range pair.

13. An image processing device according to claim 11, wherein
a pair of the achromatic-object color ranges have an overlapping color range, and
the population index value computing module use pixels values of pixels included in the overlapping color range in the computation of the population index value for only one of the achromatic-object color range pair.

14. An image processing device according to claim 6, wherein
the plurality of achromatic-object color ranges include a predetermined standard achromatic-object color range, and the achromatic-object color range selecting module further includes:
a population index value computing module configured to compute, with respect to each achromatic-object color range, a population index value correlated to the number of pixels having colors within the achromatic-object color range, and
the achromatic-object color range selecting module has a standard selection mode for selecting the standard achromatic-object color range when a difference between a population index value of the standard achromatic-object color range and the greatest population index value among the population index values of the plurality of achromatic-object color ranges is less than a standard threshold.

15. An image processing device according to claim 6, wherein
the achromatic-object color range selecting module includes
a population index value computing module configured to compute, with respect to each achromatic-object color range, a population index value correlated to the number of pixels having colors within the achromatic-object color range, and
the achromatic-object color range selecting module has a top selection mode for selecting that achromatic-object color range which has the greatest population index value among the plurality of achromatic-object color ranges.

16. An image processing device according to claim 1, wherein
the plurality of achromatic-object color ranges include:
a locus achromatic-object color range including a locus of colors exhibited by an achromatic object in response to changes in color temperature; and
a non-locus achromatic-object color range which do not include the locus and which do include colors outside the locus achromatic-object color range.

17. An image processing method for adjusting colors in an image targeted for processing, comprising:
(A) providing a plurality of achromatic-object color ranges each including some colors of an achromatic photographed object in the image targeted for processing;
(B) selecting at least one of the plurality of achromatic-object color ranges based on the image targeted for processing, the selecting at of least one of the plurality of achromatic-object color ranges including
computing, with respect to each achromatic-object color range, a population index value correlated to the number of pixels having colors within the achromatic-object color range,
selecting at least that achromatic-object color range which has a greatest population index value among the plurality of achromatic-object color ranges, and additionally selecting the achromatic-object color range having a second greatest population index value when a difference of the second greatest population index value and the greatest population index value is less than a difference threshold; and
(C) performing a color adjusting process on the image targeted for processing based on the selected achromatic-object color range, the performing of the color adjusting process including
computing a color balance correction value based on pixel values of achromatic-object-color pixels which have color within the selected achromatic-object color range among pixels of the image targeted for processing, and
performing color balancing on the entire image targeted for processing using the color balance correction value, wherein
each of the operations of the image processing method is executed by an integrated circuit.

18. A computer program product comprising a program for adjusting colors in an image targeted for processing, the program being stored on a computer readable medium, and the program causing a computer to execute functions including:
(A) selecting at least one of a plurality of predetermined achromatic-object color ranges based on the image targeted for processing, each of the ranges including some colors of an achromatic photographed object in the image targeted for processing, the selecting of at least one of the plurality of predetermined achromatic-object color ranges including
computing, with respect to each predetermined achromatic-object color range, a population index value correlated to the number of pixels having colors within the achromatic-object color range,
selecting at least that predetermined achromatic-object color range which has a greatest population index value among the plurality of predetermined achromatic-object color ranges, and
additionally selecting the predetermined achromatic-object color range having a second greatest population index value when a difference of the second greatest population index value and the greatest population index value is less than a difference threshold; and
(B) performing a color adjusting process on the image targeted for processing based on the selected achromatic-object color range, the performing of the color adjusting process including
computing a color balance correction value based on pixel values of achromatic-object-color pixels which have color within the selected achromatic-object color range among pixels of the image targeted for processing, and
performing color balancing on the entire image targeted for processing using the color balance correction value.

* * * * *